US012165559B2

(12) United States Patent
Shi et al.

(10) Patent No.: US 12,165,559 B2
(45) Date of Patent: Dec. 10, 2024

(54) DISPLAY METHOD OF DISPLAY PANEL AND DISPLAY CONTROL APPARATUS THEREOF, AND DISPLAY APPARATUS

(71) Applicants: Beijing BOE Optoelectronics Technology Co., Ltd., Beijing (CN); BOE Technology Group Co., Ltd., Beijing (CN)

(72) Inventors: Tiankuo Shi, Beijing (CN); Xin Duan, Beijing (CN); Minglei Chu, Beijing (CN); Wei Sun, Beijing (CN); Xiaomang Zhang, Beijing (CN); Shuo Zhang, Beijing (CN); Zhihua Ji, Beijing (CN); Yan Sun, Beijing (CN); Xue Dong, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/274,218

(22) PCT Filed: Jul. 8, 2022

(86) PCT No.: PCT/CN2022/104542

§ 371 (c)(1),
(2) Date: Jul. 26, 2023

(87) PCT Pub. No.: WO2023/000997

PCT Pub. Date: Jan. 26, 2023

(65) Prior Publication Data

US 2024/0071280 A1 Feb. 29, 2024

(30) Foreign Application Priority Data

Jul. 21, 2021 (CN) ........................ 202110825722.0

(51) Int. Cl.
*G09G 3/20* (2006.01)

(52) U.S. Cl.
CPC .................... *G09G 3/2074* (2013.01); *G09G 2300/0452* (2013.01); *G09G 2300/0465* (2013.01);

(Continued)

(58) Field of Classification Search
CPC ............ G09G 3/2074; G09G 2340/04; G09G 2340/0407; G09G 2340/0457
See application file for complete search history.

(56) References Cited

U.S. PATENT DOCUMENTS 4,859,997 A 8/1989 Bouron et al.
7,868,923 B2 * 1/2011 Watanabe ............ H04N 23/667 348/699

(Continued)

FOREIGN PATENT DOCUMENTS

CN 2704986 Y 6/2005
CN 101022553 A 8/2007

(Continued)

OTHER PUBLICATIONS

International Search Report for PCT/CN2022/104542 Mailed Sep. 29, 2022.

(Continued)

*Primary Examiner* — Kevin M Nguyen
(74) *Attorney, Agent, or Firm* — Ling Wu; Stephen Yang; Ling and Yang Intellectual Property

(57) ABSTRACT

A display method comprises: acquiring multiple frames of images to be displayed, one frame of two adjacent frames of the images to be displayed being an image in an odd-numbered row, the other frame being an image in an even-numbered row, the resolution of the image in the odd-numbered row being M*(a*N), the resolution of the image in the even-numbered row being M*(a*N) or (M−1)

(Continued)

*(a*N), and a being 1 or 2; and causing an odd-numbered display group to display the image in the odd-numbered row, and causing an even-numbered display group to display the image in the even-numbered row, the odd-numbered display group comprising M*(a*N) odd-numbered display units, the even-numbered display group comprising (M−1)*(a*N) even-numbered display units, the odd-numbered display unit in the i-th row comprising a first sub-pixel, a second sub-pixel, and a third sub-pixel in a pixel unit in the i-th row.

15 Claims, 9 Drawing Sheets

(52) U.S. Cl.
CPC ................. *G09G 2320/028* (2013.01); *G09G 2340/0407* (2013.01)

(56) References Cited

U.S. PATENT DOCUMENTS

| | | | | |
|---|---|---|---|---|
| 2008/0037120 | A1 | 2/2008 | Koo et al. | |
| 2015/0317938 | A1* | 11/2015 | Fujioka | G09G 3/3614 345/87 |
| 2016/0249010 | A1* | 8/2016 | Greene | H04N 7/0122 |
| 2017/0076701 | A1 | 3/2017 | Hu et al. | |
| 2017/0243557 | A1 | 8/2017 | Yoon | |

FOREIGN PATENT DOCUMENTS

| | | | |
|---|---|---|---|
| CN | 101123735 | A | 2/2008 |
| CN | 101296303 | A | 10/2008 |
| CN | 105070220 | A | 11/2015 |
| CN | 106385575 | A | 2/2017 |
| CN | 106856084 | A | 6/2017 |
| CN | 109036257 | A | 12/2018 |
| CN | 109451312 | A | 3/2019 |
| CN | 109982091 | A | 7/2019 |
| CN | 209858911 | U | 12/2019 |
| CN | 112185304 | A | 1/2021 |
| JP | 2002215082 | A | 7/2002 |
| JP | 2020-150373 | A | 9/2020 |
| KR | 10-2007-0070327 | A | 7/2007 |
| TW | 201310416 | A1 | 3/2013 |

OTHER PUBLICATIONS

Hu, "Research and Implementation of a Driving Method to Improve the Resolution of Microdisplay", Master's Degree Thesis, 2020.

Partial Supplementary European Search Report for 22845162.1 Mailed Jul. 18, 2024.

Office Action dated Sep. 18, 2024 for Chinese Patent Application No. 202110825722.0 and English Translation.

* cited by examiner

DISPLAY METHOD OF DISPLAY PANEL AND DISPLAY CONTROL APPARATUS THEREOF, AND DISPLAY APPARATUS

CROSS-REFERENCE TO RELATED APPLICATIONS

The present application is a U.S. National Phase Entry of International Application PCT/CN2022/104542 having an international filing date of Jul. 8, 2022, which claims priority of Chinese Patent Application No. 202110825722.0, entitled “Display Method of Display Panel and Display Control Apparatus Thereof, and Display Apparatus”, filed with the CNIPA on Jul. 21, 2021, the contents of which should be regarded as being incorporated to the present application herein by reference.

TECHNICAL FIELD

Embodiments of the present disclosure relate to, but are not limited to, the field of display technologies, and particularly to a display method of a display panel, a display control apparatus of the display panel, and a display apparatus.

BACKGROUND

A resolution of a display refers to a quantity of pixels constituting a screen of the display. For example, a 4K display refers to a display device with a resolution of 4K (4096×2160), that is, there are 4096 pixels horizontally and 2160 pixels vertically in the screen of the display. A resolution of an image refers to a quantity of pixels in an image, such as 2K (2048×1080), 4K (4096×2160), 8K (7680×4320) and other resolutions of the image.

When a resolution of an image is higher than that of a display, there are two display solutions, one of which is partial display, that is, a display screen displays as many as the pixels. At this time, only a part of the image can be seen, and full content can be seen by moving up, down, left and right. Another display solution is to display a complete image on a display screen. At this time, pixels in the image are sampled. For example, a part of pixels in an image with 8K resolution are deleted when the image is to be displayed on a screen with 4K resolution. At that time, although contents of the image can be seen c, some pixels of details are lost, thus losing details of a picture and seriously affecting the user’s viewing experience.

SUMMARY

The following is a summary of subject matter described herein in detail. The summary is not intended to limit the protection scope of claims.

A display method of a display panel is provided in an embodiment of the present disclosure, wherein the display panel includes M*N pixel units, both of M and N are natural numbers, each of the pixel units includes one or more first sub-pixels arranged in a first direction, one or more second sub-pixels arranged in the first direction, and one or more third sub-pixels arranged in the first direction; the one or more first sub-pixels, the one or more second sub-pixels and the one or more third sub-pixels are arranged in a second direction with respect to each other, and the first direction intersects with the second direction; the display method includes:

acquiring a plurality of frames of images to be displayed, wherein one frame in adjacent two frames of the images to be displayed is an odd-numbered line image with a resolution of M*(a*N), and another frame in the adjacent two frames of the images to be displayed is an even-numbered line image with a resolution of M*(a*N) or (M−1)*(a*N), and a is 1 or 2; and an odd-numbered display group displaying the odd-numbered line image, and an even-numbered display group displaying the even-numbered line image; wherein the odd-numbered display group includes M*(a*N) odd-numbered display units, and the even-numbered display unit includes (M−1)*(a*N) even-numbered display units, an odd-numbered display unit in an i-th line includes a first sub-pixel in an i-th line pixel unit, a second sub-pixel of the i-th line pixel unit and a third sub-pixel in the i-th line pixel unit, an even-numbered display unit in a j-th line includes a second sub-pixel of a j-th line pixel unit, a third sub-pixel in the j-th line pixel unit, a first sub-pixel in a (j+1)-th line pixel unit and a second sub-pixel in the (j+1)-th line pixel unit, wherein i is a natural number between 1 and M, and j is a natural number between 1 and (M−1).

A display control apparatus for a display panel is further provided in an embodiment of the present disclosure. The display control apparatus includes a memory, a processor and a computer program stored on the memory and capable of running on the processor, wherein when executing the program, the processor implements steps of the display method in any embodiment described above.

A display apparatus is further provided in an embodiment of the present disclosure. The display apparatus includes a display panel that includes M*N pixel units, each of the pixel units includes one or more first sub-pixels arranged in a first direction, one or more second sub-pixels arranged in the first direction, and one or more third sub-pixels arranged in the first direction. The one or more first sub-pixels, the one or more second sub-pixels and the one or more third sub-pixels are arranged in a second direction, and the first direction intersects with the second direction. The display apparatus further includes the display control apparatus described above.

Other aspects may become clear upon reading and understanding of the accompanying drawings and the detailed description.

BRIEF DESCRIPTION OF DRAWINGS

Accompanying drawings are used for providing understanding of technical solutions of the present disclosure, and form a part of the specification. They are used for explaining the technical solutions of the present disclosure together with embodiments of the present disclosure, but do not form a limitation on the technical solutions of the present disclosure.

DETAILED DESCRIPTION

Figure 1:
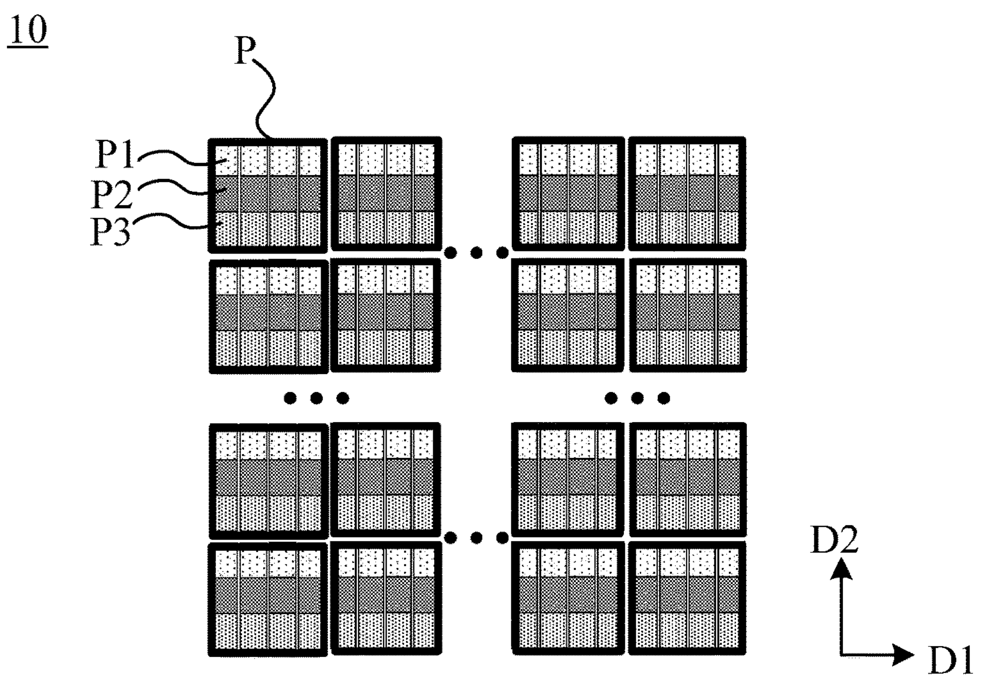
FIG. 1 is a schematic diagram of a structure of a display panel according to an embodiment of the present disclosure.

To make objectives, technical solutions, and advantages of the present disclosure clearer, the embodiments of the present disclosure will be described in detail with reference to the accompanying drawings. It is to be noted that implementations may be practiced in a plurality of different forms. Those of ordinary skills in the art may easily understand such a fact that implementations and contents may be transformed into various forms without departing from the purpose and scope of the present disclosure. Therefore, the present disclosure should not be explained as being limited to contents described in following implementations only. The embodiments in the present disclosure and features in the embodiments may be combined randomly with each other if there is no conflict.

In the drawings, a size of a constituent element, a thickness of a layer, or a region is exaggerated sometimes for clarity. Therefore, one implementation of the present disclosure is not necessarily limited to the sizes, and shapes and sizes of various components in the drawings do not reflect actual scales. In addition, the drawings schematically illustrate ideal examples, and one implementation of the present disclosure is not limited to shapes, numerical values, or the like shown in the drawings.

Ordinal numerals such as “first”, “second”, and “third” in the specification are set to avoid confusion between constituent elements, but not to set a limit in quantity.

In the specification, for convenience, wordings indicating orientation or positional relationships, such as “middle”, “upper”, “lower”, “front”, “back”, “vertical”, “horizontal”, “top”, “bottom”, “inside”, and “outside”, are used for illustrating positional relationships between constituent elements with reference to the drawings, and are merely for facilitating the description of the specification and simplifying the description, rather than indicating or implying that a referred apparatus or element must have a particular orientation and be constructed and operated in the particular orientation. Therefore, they cannot be understood as limitations on the present disclosure. The positional relationships between the constituent elements may be changed as appropriate according to directions for describing the various constituent elements. Therefore, appropriate replacements may be made according to situations without being limited to the wordings described in the specification.

In the specification, unless otherwise specified and defined explicitly, terms “mount”, “mutually connect”, and “connect” should be understood in a broad sense. For example, a connection may be a fixed connection, or a detachable connection, or an integrated connection. It may be a mechanical connection or an electrical connection. It may be a direct mutual connection, or an indirect connection through middleware, or internal communication between two components. Those of ordinary skills in the art may understand specific meanings of these terms in the present disclosure according to specific situations.

In the specification, “parallel” refers to a state in which an angle formed by two straight lines is above −10° and below 10°, and thus also includes a state in which the angle is above −5° and below 5°. In addition, “perpendicular” refers to a state in which an angle formed by two straight lines is above 80° and below 100°, and thus also includes a state in which the angle is above 85° and below 95°.

A display method of a display panel is further provided in an embodiment of the present disclosure. The display panel includes M*N pixel units, each of which includes one or more first sub-pixels arranged in a first direction, one or more second sub-pixels arranged in the first direction, and one or more third sub-pixels arranged in the first direction. The first sub-pixel(s), the second sub-pixel(s) and the third sub-pixel(s) are arranged in a second direction, and the first direction intersects with the second direction. The display method includes:

- acquiring a plurality of frames of images to be displayed, wherein one frame in adjacent two frames of images to be displayed is an odd-numbered line image with a resolution of M*(a*N), and another frame in the adjacent two frames of the images is an even-numbered line image with a resolution of M*(a*N) or (M−1)*(a*N), where a is 1 or 2; and
- an odd-numbered display group displaying the odd-numbered line image, and an even-numbered display group displaying the even-numbered line image; wherein the odd-numbered display group includes M*(a*N) odd-numbered display units, and the even-numbered display unit includes (M−1)*(a*N) even-numbered display units, an odd-numbered display unit in an i-th line includes a first sub-pixel in an i-th line pixel unit, a second sub-pixel in the i-th line pixel unit and a third sub-pixel in the i-th line pixel unit, an even-numbered display unit in a j-th line includes a second sub-pixel in a j-th line pixel unit, a third sub-pixel in the j-th line pixel unit, a first sub-pixel in a (j+1)-th line pixel unit and a second sub-pixel in the (j+1)-th line pixel unit, wherein the number i is a natural number between 1 and M, and the number j is a natural number between 1 and (M−1).

According to the display method of the display panel in the embodiment of the present disclosure, the pixel units in the display panel are divided into an odd-numbered display group and an even-numbered display group, so that the odd-numbered display group displays an odd-numbered line image, and the even-numbered display group displays an even-numbered line image, thus achieving time division multiplexing of the sub-pixels, thereby improving a resolution display effect of the display panel and enabling the display panel to display clearer images with richer details.

FIG. 1 is a schematic diagram of a structure of a display panel according to an exemplary embodiment of the present disclosure. The display panel 10 may include M*N pixel units P, each of which includes one or more first sub-pixels P1 arranged in a first direction D1, one or more second sub-pixels P2 arranged in the first direction D1, and one or more third sub-pixels P3 arranged in the first direction D1. The first sub-pixel(s) P1, the second sub-pixel(s) P2 and the third sub-pixel(s) P3 are arranged in a second direction D2, and the first direction D1 intersects with the second direction D2.

In some exemplary implementations, the first sub-pixels P1 may be red sub-pixels (R) emitting red light, the second sub-pixels P2 may be green sub-pixels (G) emitting green light, and the third sub-pixels P3 may be blue sub-pixels (B) emitting blue light. In some other exemplary implementations, the first sub-pixels P1, the second sub-pixels P2, and the third sub-pixels P3 may be sub-pixels in other colors. Or, each pixel unit may contain sub-pixels in three or more different colors, such as sub-pixels in four different colors, which is not limited in the present disclosure.

In some exemplary implementations, shapes of the sub-pixels may be rectangular, rhombic, pentagonal, hexagonal, or the like.

In some exemplary implementations, three sub-pixels, i.e., one first sub-pixel P1, one second sub-pixel P2, and one third sub-pixel P3 may be arranged side-by-side in a vertical direction to form an RGB pixel arrangement. In some other exemplary implementations, a plurality of sub-pixels may be arranged in a form of a square, a diamond, side-by-side in a horizontal direction or the like, which is not limited in the present disclosure.

In some exemplary implementations, the first direction D1 may be an extension direction (row direction) of scan signal lines in a display region, and the second direction D2 may be an extension direction (column direction) of data signal lines in the display region. The first direction D1 intersects with the second direction D2. For example, the first direction D1 may be perpendicular to the second direction D2.

3D display has gradually become popular in recent years. A main principle of 3D display technologies is to make a viewer's left eye and right eye receive different images respectively, and the images in the left eye and the right eye are analyzed and overlapped by human brain, so that the viewer may perceive a sense of depth of the images, thereby generating stereo perception. Autostereoscopy (glasses-free 3D) display technologies are focused issues in the field of 3D display technologies.

The autostereoscopy display technologies mainly include holographic 3D display technologies, volumetric 3D display technologies, free stereoscopic 3D display technologies and the like. The free stereoscopic 3D display technologies has been considered as the autostereoscopy display technologies that may be commercialized the fastest due to dynamic, colored and large field-of-view 3D display effects that can achieved by it. The free stereoscopic 3D display technologies include autostereoscopy display technologies based on geometrical optics, such as cylindrical lens array technologies, parallax barrier technologies, microlens array technologies and the like. Such technologies are mainly based on principles of straight travelling, reflection and refraction of light. Images from different angles of view are projected at different viewpoint positions by designing a structure to change an exit direction of each pixel in a display panel, so that user's left and right eyes can see the images from different angles of view, thereby forming a stereoscopic vision sense.

Figure 2:
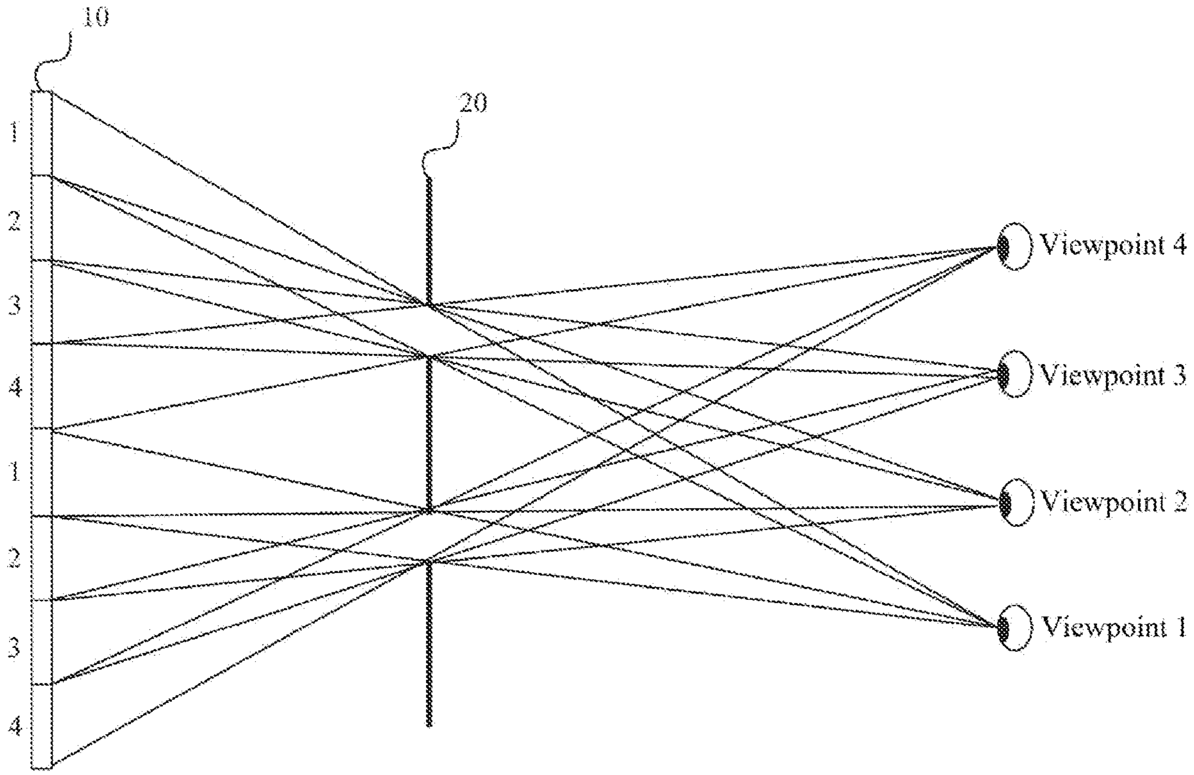
FIG. 2 is a schematic diagram of a principle of an autostereoscopy display in a display panel according to an embodiment of the present disclosure.

At present, Multi View technologies are usually used for autostereoscopy displaying, that is, multiple viewpoints are set to enable a user to see 3D display pictures at a plurality of positions. As shown in FIG. 2, an optical grating structure 20 arranged vertically is provided in front of a display panel 10 and the display panel 10 is used for displaying images from four viewpoints (1, 2, 3 and 4), and a viewer can see 3D images at a plurality of positions, thereby providing the viewer with more viewing freedom.

According to the display panel in the embodiment of the present disclosure, RGB pixels arranged horizontally are transformed into RGB pixels arranged vertically, and a plurality of sub-pixels displayed in a same color in the row direction in each pixel unit can be controlled independently (as shown in FIG. 1, there are four sub-pixels displayed in a same color in the row direction in each pixel unit which can be controlled independently. In practice, there may be 16 or more sub-pixels. For example, there may be an even number of sub-pixels displayed in a same color in each pixel unit P). The display arrangement has an advantage that the autostereoscopy Multi View display with a resolution of M*N can be achieved by attaching the vertically arranged optical grating structure (4 sub-pixels displayed in a same color display can achieve 4-view display, and 16 sub-pixels displayed in a same color can achieve 16-view display), wherein M is a quantity of rows in the pixel unit and N is a quantity of columns in the pixel unit. Furthermore, optical characteristics of the optical grating structure are controlled by a voltage control circuit, and it is possible to switch between 2D and 3D display modes. When 2D display is required, the pixel units P can display a 2D picture. At that time, a same gray-scale value are input into all of a plurality of sub-pixels displayed in a same color in a same pixel unit P, and the viewer can see the 2D picture with the resolution of M*N.

A resolution of the image refers to a quantity of pixels in an image, such as 2K (2048×1080), 4K (4096×2160), 8K (7680×4320) and other resolutions of the image. At present, because the resolution of images is usually high, the resolution of the display panels is often lower than that of images.

When a resolution of an image is higher than that of a display, there are two display solutions, one of which is partial display, that is, a display screen displays as many as the pixels. At this time, only a part of the image can be seen, and full content can be seen by moving up, down, left and right. Another display solution is to display a complete image on a display screen. At this time, pixels in the image are sampled. For example, a part of pixels in an image with 8K resolution are deleted when the image is to be displayed on a screen with 4K resolution. At that time, although contents of the image can be seen completely, some pixels of details are lost, thus losing details of a picture and seriously affecting the user's viewing experience.

Figure 3:
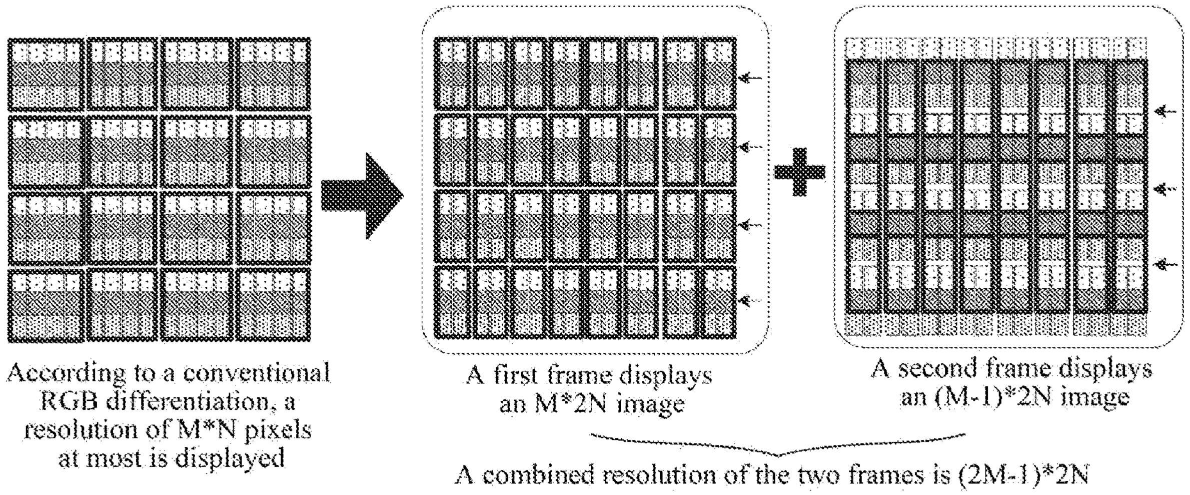
FIG. 3 is a schematic diagram of a principle of time division multiplexing of sub-pixels in a display panel according to an embodiment of the present disclosure.

A display method of a display panel is provided in an embodiment of the present disclosure. As shown in FIG. 3, the display panel includes M*N pixel units P, each of the pixel units P includes a plurality of first sub-pixels P1 arranged in a first direction D1, a plurality of second sub-pixels P2 arranged in the first direction D1, and a plurality of third sub-pixels P3 arranged in the first direction D1. The three types of sub-pixels, i.e., the first sub-pixels P1, the second sub-pixels P2 and the third sub-pixels P3 are respectively arranged in a second direction D2, and the first direction D1 intersects with the second direction D2. The display method includes the following steps.

A plurality of frames of images to be displayed are acquired, wherein one frame in adjacent two frames of images to be displayed is an odd-numbered line image with a resolution of M*2N, and another frame in the adjacent two frames of the images to be displayed is an even-numbered line image with a resolution of M*2N or (M−1)*2N;

An odd-numbered display group displays the odd-numbered line image, and an even-numbered display group displays the even-numbered line image. The odd-numbered display group includes M*2N odd-numbered display units, and the even-numbered display unit includes (M−1)*2N even-numbered display units. An odd-numbered display unit in an i-th line includes a first sub-pixel in an i-th line pixel unit, a second sub-pixel in the i-th line pixel unit and a third sub-pixel in the i-th line pixel unit. An even-numbered display unit in a j-th line includes a second sub-pixel in a j-th line pixel unit, a third sub-pixel in the j-th line pixel unit, a first sub-pixel in a (j+1)-th line pixel unit and a second sub-pixel in the (j+1)-th line pixel unit, wherein the number i is a natural number between 1 and M, and the number j is a natural number between 1 and (M−1).

According to the display method of the display panel in the embodiment of the present disclosure, the display panel with an original resolution of M*N is split have a resolution of 2N in a vertical direction. That is, one original pixel unit is split into two display units controlled separately, and two frames are multiplexed in a horizontal direction, in which one frame takes the second sub-pixel as a pixel centroid to build a resolution of M, and another frame takes the third sub-pixel and the first sub-pixel as a pixel centroid to build a resolution of (M−1). The two frames are alternately displayed to build a display with a resolution of (2M−1), thereby improving the image display resolution and achieving resolution improvement in a 2D display mode.

The display method can be integrated in a driver chip of the display panel as an algorithm Intelligent Property (IP for short) module. By processing data of an input picture, an image with a high resolution of 2M*2N is split into two frames of images with a resolution of M*2N for alternate display, thus improving the resolution. On the other hand, due to an effect that two frames are multiplexed into one frame, a real display frequency is half of a display frequency of the display, theretofore a display having a higher frequency is preferred. A low refresh rate of a display panel leads to jitter between two frames. According to the current display technologies, a refresh rate of 120 Hz can be reached generally. By virtue of the display method in the embodiment of the present disclosure, the refresh rate can reach 60 Hz, and a better visual effect can also be achieved.

In some exemplary embodiments, each frame of image to be displayed is split into an odd-numbered line image and an even-numbered line image by a video generator, or split into an odd-numbered image and an even-numbered line image by a video player.

Figure 4:
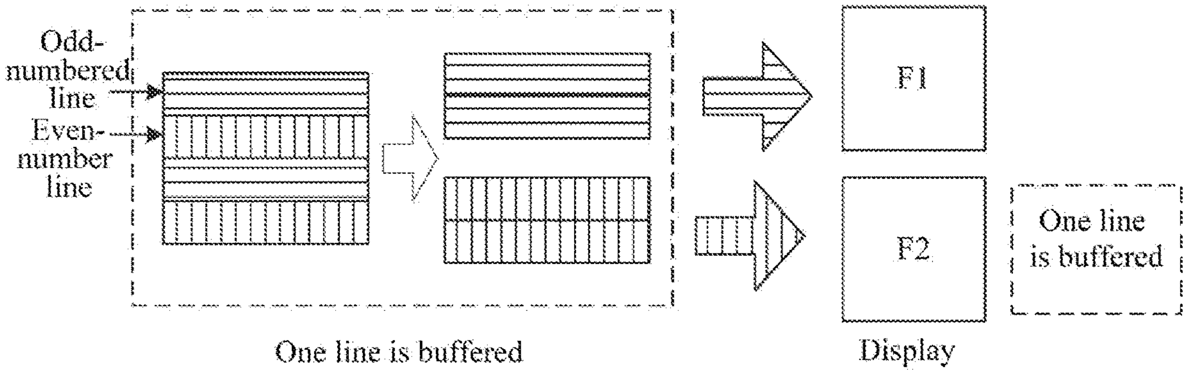
FIG. 4 is a schematic diagram of a display method of a display panel according to an embodiment of the present disclosure.

As shown in FIG. 4, when each frame of image to be displayed is split into an odd-numbered line image and an even-numbered line image by the video generator, a system of the video generator divides a frame of picture with a high resolution of 2M*2N into a frame of an odd-numbered line image and a frame of an even-numbered line image (the video generator is usually a Graphics Processing Unit (GPU for short) that performs processing according to a requirement of extracting data from odd and even lines), and transmits the images to the display panel. In this way, each frame of image with a resolution of 2M*2N can be divided into two frames of image with a resolution of M*2N. The two frames, F1 and F2, are transmitted to the display panel. The above-mentioned process repeatedly carries on. At this time, the display panel needs to store display data of a line image in a buffer in advance.

Figure 5:
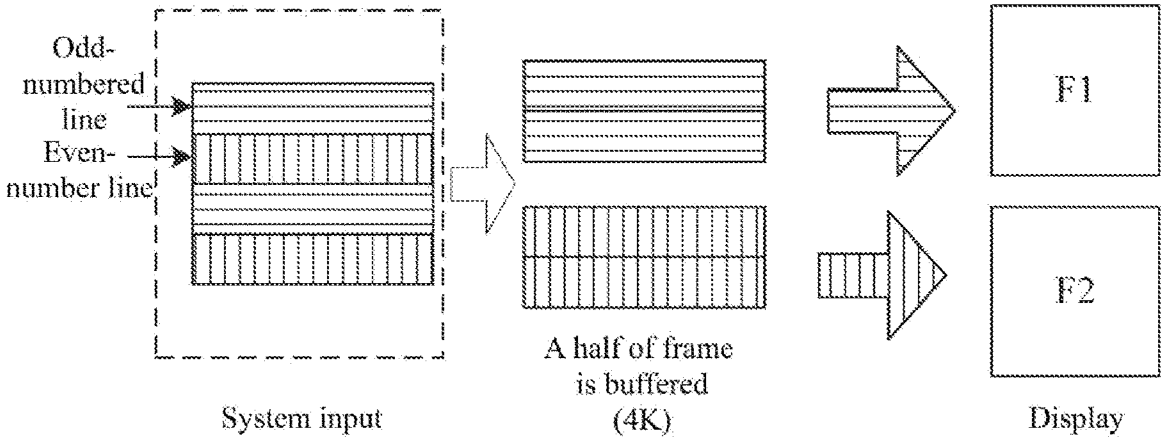
FIG. 5 is a schematic diagram of another display method of a display panel according to an embodiment of the present disclosure.

As shown in FIG. 5, when each frame of image to be displayed is split into an odd-numbered line image and an even-numbered line image by the video player, the system of the video generator directly splits the image transmitted to the system of the video generator at the display panel without need of changing a shape of the picture transmitted to the system. At this time, the display panel needs to store a half data of the frame in advance (when the image to be displayed is an 8K image, the display panel needs to buffer data of a 4K image), which further occupies storage resources of a driver chip of the display panel.

Figure 6:
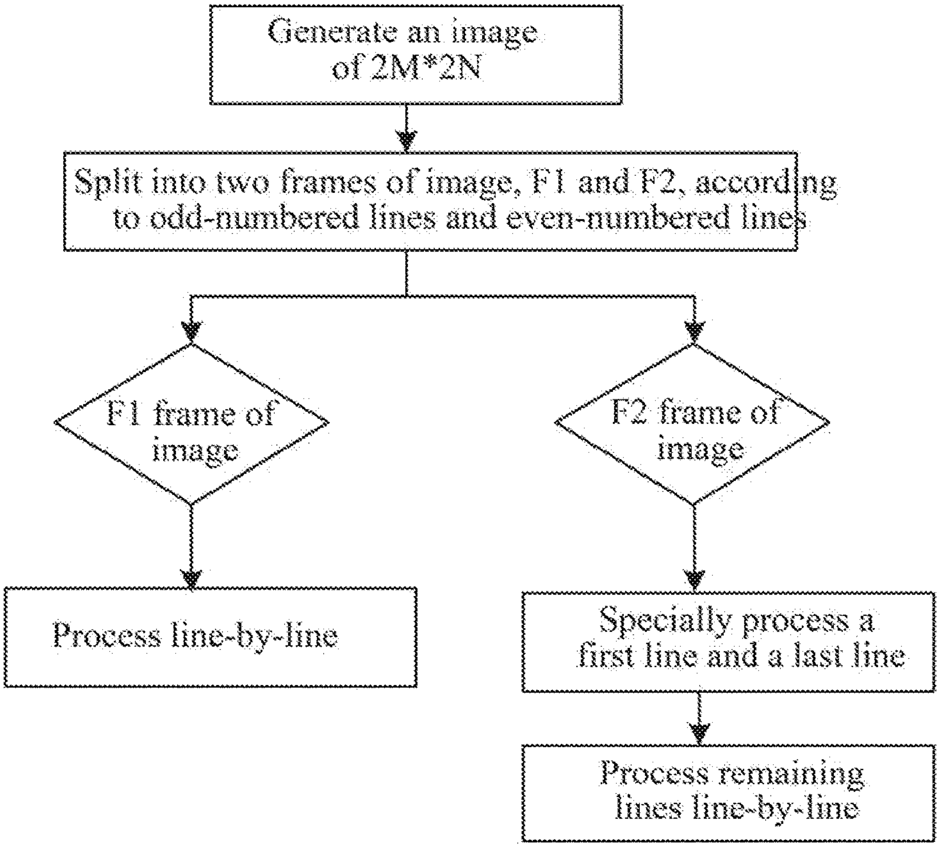
FIG. 6 is a flowchart of a display method of a display panel according to an embodiment of the present disclosure.

As shown in FIG. 6, a video generator generates an image with a resolution of 2M*2N, and then the video generator or a video player splits the image into an odd-numbered line image and an even-numbered line image, so that the odd-numbered display group displays the odd-numbered line image line-by-line, and the even-numbered display group displays the even-numbered line image.

Figure 7:
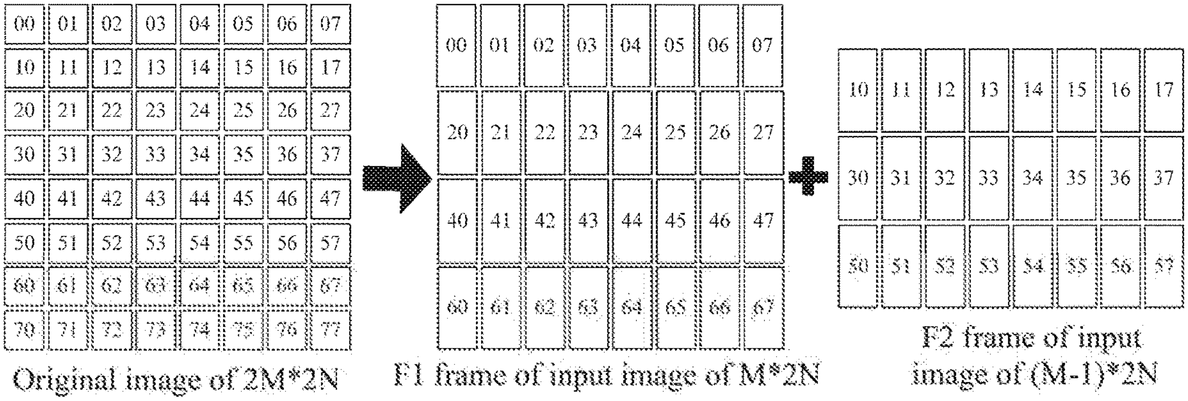
FIG. 7 is a schematic diagram of a method for splitting one frame of image according to an embodiment of the present disclosure.

An image splitting method is shown with reference to FIG. 7. Odd-even line splitting is performed according to line numbers, in which an odd-numbered line image is composed of data of the odd-numbered line image, and an even-numbered line image is composed of data of the even-numbered line image. The odd-numbered line image and the even-numbered line image are successively transmitted to the display panel. Since an even-numbered line display group loses one line of data when displaying the even-numbered line image, a last line of an original image may not be transmitted, that is, the even-numbered line image (F2 frame) transmits one line of data less than the odd-numbered line image (F1 frame).

In some exemplary embodiments, each pixel unit includes 2b first sub-pixels arranged in a first direction, 2b second sub-pixels arranged in the first direction, 2b third sub-pixels arranged in the first direction, wherein b is a natural number greater than or equal to 1. Each pixel unit is divided into 2 sub-pixel units, each sub-pixel unit includes b first sub-pixels arranged in the first direction, b second sub-pixels arranged in the first direction, and b third sub-pixels arranged in the first direction. For example, as shown in FIG. 3, b=2.

In some exemplary embodiments, the odd-numbered display group displaying the odd-numbered line image includes:

for 1≤X≤M, 1≤Y≤2N, a first sub-pixel of a sub-pixel unit in an X-th row and a Y-th column displaying a gray-scale value of a first image pixel unit in an X-th row and an Y-th column in the odd-numbered line image, a second sub-pixel of the sub-pixel unit in the X-th row and the Y-th column displaying a gray-scale value of a second image pixel unit in the X-th row and the Y-th column in the odd-numbered line image, and a third sub-pixel of the sub-pixel unit in the X-th row and the Y-th column displaying a gray-scale value of a third image pixel unit in the X-th row and the Y-th column in the odd-numbered line image.

Figure 8:
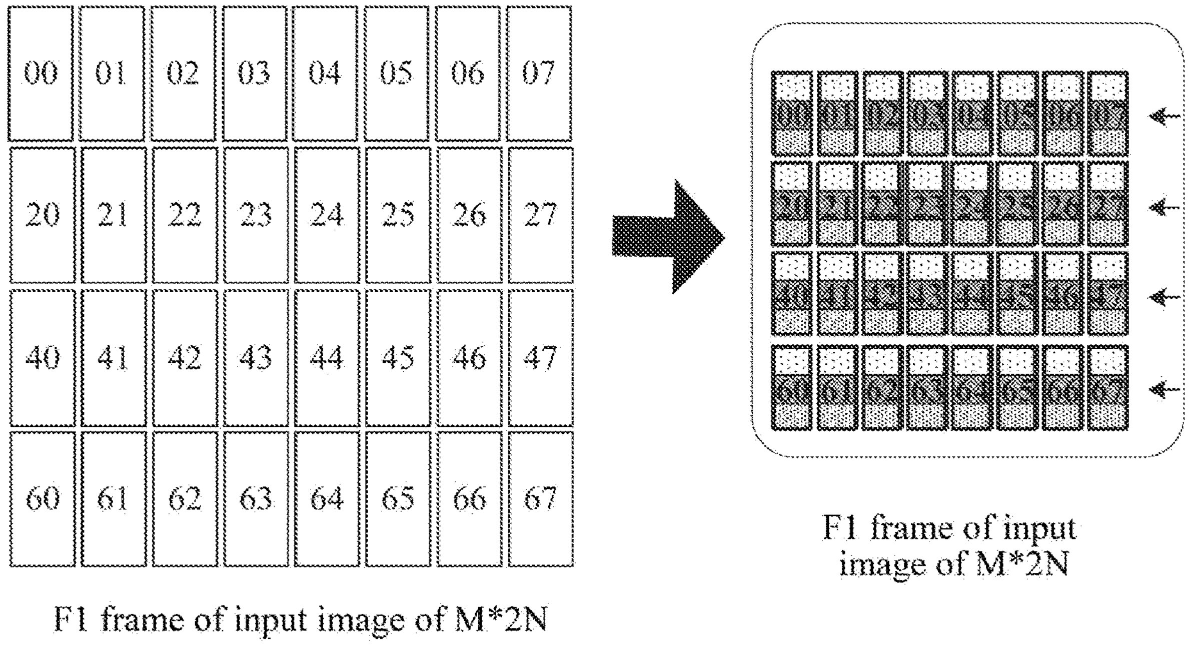
FIG. 8 is a schematic diagram of an image processing method of an odd-numbered line image according to an embodiment of the present disclosure.

In this embodiment, if the image is an F1 frame image, an image with a resolution of M*2N is displayed according to FIG. 8. R, G and B of a "00"-numbered pixel in the input F1 frame image correspond to R, G, and B pixels centered on a second sub-pixel "00" in a displayed image, respectively. As shown in FIG. 8, each rectangular frame of an input image on the left represents the input RGB pixel data. Each bold black rectangular frame in a displayed image on the right corresponds to an odd-numbered display unit. An odd-numbered display unit in an i-th line includes b first sub-pixels of pixel units in the i-th line, b second sub-pixels of the pixel units in the i-th line and b third sub-pixels of the pixel units in the i-th line, wherein i is a natural number between 1 and M, and a plurality of sub-pixels in a same color in each odd-numbered display unit provide a same gray-scale value for display. Assignments of the input data to the display pixels are performed according to one-to-one correspondence, with reference to the following formula.

Display $R(X,Y)(1-b)$=input $R(X,Y)$;display $G(X,Y)(1-b)$=input $G(X,Y)$;display $B(X,Y)(1-B)$=input $B(X,Y)$; where $X=1\sim M$, and $Y=1\sim 2N$.

In some exemplary embodiments, the even-numbered display group displaying the even-numbered line image includes:

- for 2≤c≤M, 1≤Y≤2N, a first sub-pixel of a sub-pixel unit in a c-th row and a Y-th column displaying a gray-scale value of a first image pixel unit in a (c−1)-th row and a Y-th column in the even-numbered line image;
- for 1≤Y≤2N, a second sub-pixel of a sub-pixel unit in a first row and the Y-th column displaying A times of a gray-scale value of the second image pixel unit in a first row and the Y-th column in the even-numbered line image, wherein A is a real number between 0 and 1;
- for 2≤d≤(M−1) and 1≤Y≤2N, a second sub-pixel of a sub-pixel unit in a d-th row and the Y-th column displaying a sum of A times of a gray-scale value of a second image pixel unit in a d-th row and the Y-th column in the even-numbered line image and (1-A) times of a gray-scale value of a second image pixel unit in a (d−1)-th row and the Y-th column in the even-numbered line image;
- for 1≤Y≤2N, a second sub-pixel of a sub-pixel unit in an M-th row and the Y-th column displaying (1-A) times of a gray-scale value of a second image pixel unit in an (M−1)-th row and the Y-th column in the even-numbered line image; and
- for 1≤e≤(M−1), 1≤Y≤2N, a third sub-pixel of a sub-pixel unit in an e-th row and the Y-th column displaying a gray-scale value of a third image pixel unit in an e-th row and the Y-th column in the even-numbered line image.

In some exemplary embodiments, the even-numbered display group displaying the even-numbered line image further includes:

- for 1≤Y≤2N, a first sub-pixel of a sub-pixel unit in a first row and a Y-th column displaying a gray-scale value of 0 or a gray-scale value of a first image pixel unit in the first row and the Y-th column in the odd-numbered line image; and
- for 1≤Y≤2N, a third sub-pixel of a sub-pixel unit in an M-th row and the Y-th column displaying the gray-scale value of 0 or a gray-scale value of a third image pixel unit in the M-th row and the Y-th column in the odd-numbered line image.

In some exemplary embodiments, A=0.5.

Figure 9:
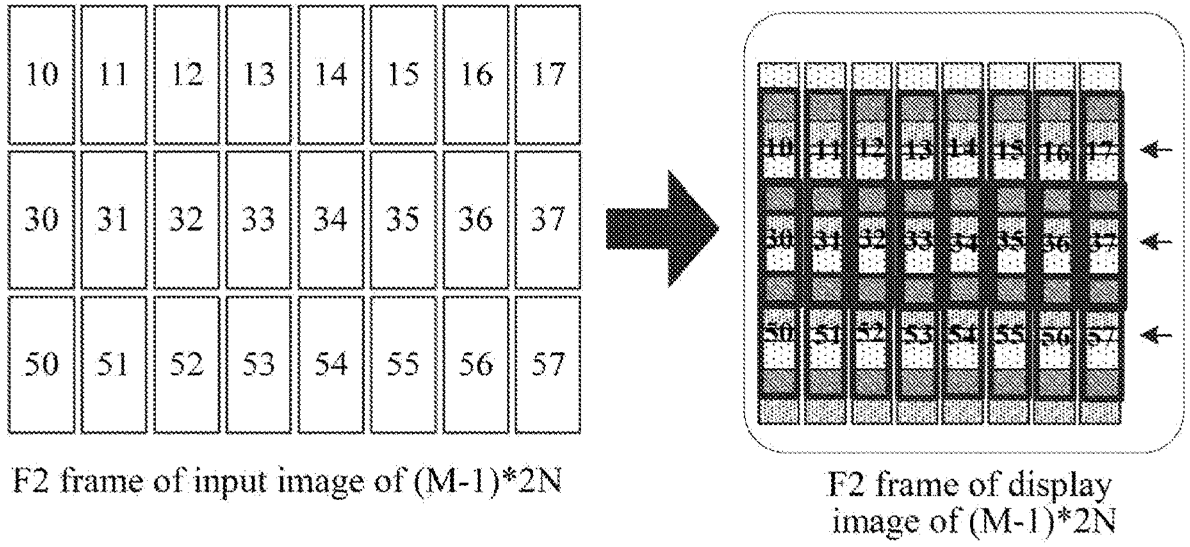
FIG. 9 is a schematic diagram of an image processing method of an even-numbered line image according to an embodiment of the present disclosure.

In this embodiment, if the image is an F2 frame image, an image with a resolution of (M−1)*2N is displayed according to FIG. 9. As shown in FIG. 9, each rectangular frame of an input image on the left represents input RGB pixel data. Each bold black rectangular frame in a displayed image on the right corresponds to an even-numbered display unit. An even-numbered display unit in a j-th line includes b second sub-pixels of pixel units in the j-th line, b third sub-pixels of the pixel units in the j-th line, b first sub-pixels of pixel units in a (j+1)-th line and b second sub-pixels of the pixel units in the (j+1)-th line, wherein j is a natural number between 1 and (M−1). Two adjacent even-numbered display units located in the j-th line and the (j+1)-th line respectively need to share b second sub-pixels in the pixel units in the (j+1)-th line, and a plurality of sub-pixels in a same color in each even-numbered display unit provide a same gray-scale value for display. Assignments of the input data to the display pixels can be performed with reference to the following steps (1) to (3) (assuming that first sub-pixels are red sub-pixels, the second sub-pixels are green sub-pixels, and the third sub-pixels are blue sub-pixels).

(1) Red sub-pixels in a first line are specially processed, 0 or a value same as that in the F1 frame can be assigned to all of the red sub-pixels (in this case, data in one line in the F1 frame can be stored for use by the F2 frame).

Display $R(1,Y)(1-b)=0$; or, display $R(1,Y)(1-b)(F2)$= display $R(1,Y)(1-b)(F1)$, where $1\leq Y\leq 2N$.

Data of red sub-pixels in a non-first line are processed according to the following formula:

Display $R(c,Y)(1-b)$=input $R(c-1,Y)$, where $2\leq c\leq M$.

(2) Green sub-pixels are processed. For a sub-pixel displaying "10" G, a sub-pixel with an input "10" G is split into a "10" G1 sub-pixel and a "10" G2 sub-pixel. The "10" G1 sub-pixel is displayed in the sub-pixel displaying "10" G, and "10" G2 sub-pixel is stored in a linebuffer. After a sub-pixel displaying "30" is split into a sub-pixel "30" G1 and a "30" G2 sub-pixel, the "10" G2 sub-pixel and the "30" G1 sub-pixel are added and assigned to the sub-pixel with the input "30" G, and the "30" G2 sub-pixel corresponding to the sub-pixel with the input "30" is also stored. After a sub-pixel with an input "50" G is split into "50" G1 and "50" G2 sub-pixels, the "30" G2 sub-pixel and the "50" G1 sub-pixel are added and assigned to the sub-pixel with the input "50" G, and so on. The split algorithm can directly divide an original G pixel value by 2. The following formula can be used.

For $G$ in a first line: display $G(1,Y)(1-b)=A$*input $G(1,Y)$;

for $G$ in other lines: display $G(d,Y)(1-b)=A$*input $G(d,Y)+(1-A)$*input $G(d-1,Y)$, where $2\leq d\leq(M-1)$;

for $G$ in a last line: display $G(M,Y)(1-b)=(1-A)$*input $G(M-1,Y)$;

where A can be set to any value between 0 and 1. For example, A=0.5.

(3) Data of blue sub-pixels in a non-last line are processed according to the following formula:

$$\text{display } B(e,Y)(1-B)=\text{input } B(e,Y), \text{ where } 1\le e\le M-1.$$

Blue sub-pixels in the last line are specially processed, 0 or a value same as that in the F1 frame can be assigned to all of the blue sub-pixels (data in one line in the F1 frame are stored for the F2 frame).

$$\text{Display } B(M,Y)(1-b)=0; \text{ or display } B(M,Y)(1-b)(F2)=\text{display } B(M,Y)(1-b)(F1).$$

In some exemplary embodiments, acquiring the plurality of frames of images to be displayed includes:

receiving an original image with a resolution of M*N;

stretching the original image to obtain a fourth intermediate processing image with a resolution of 2M*2N; and splitting the fourth intermediate processing image into an odd-numbered line image and an even-numbered line image to obtain an image to be displayed.

Figure 10:
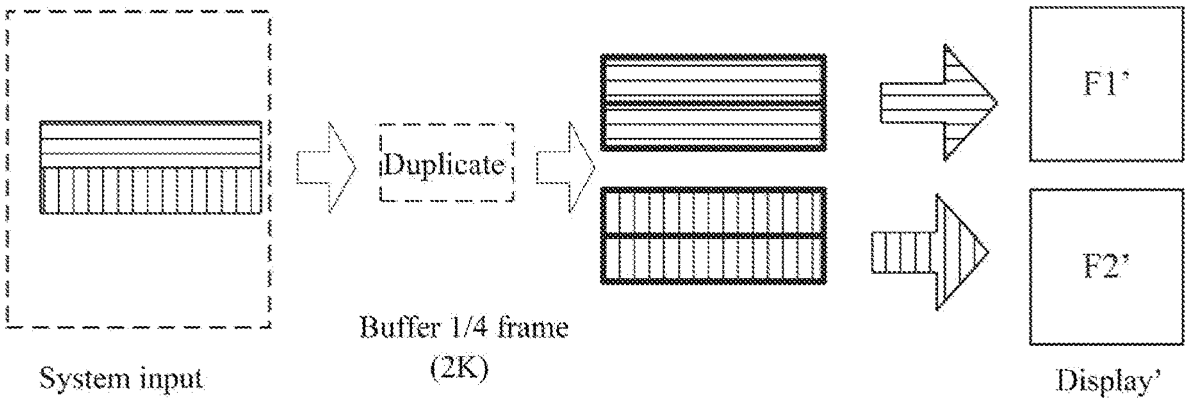
FIG. 10 is a schematic diagram of yet another display method of a display panel according to an embodiment of the present disclosure.
Figure 11:
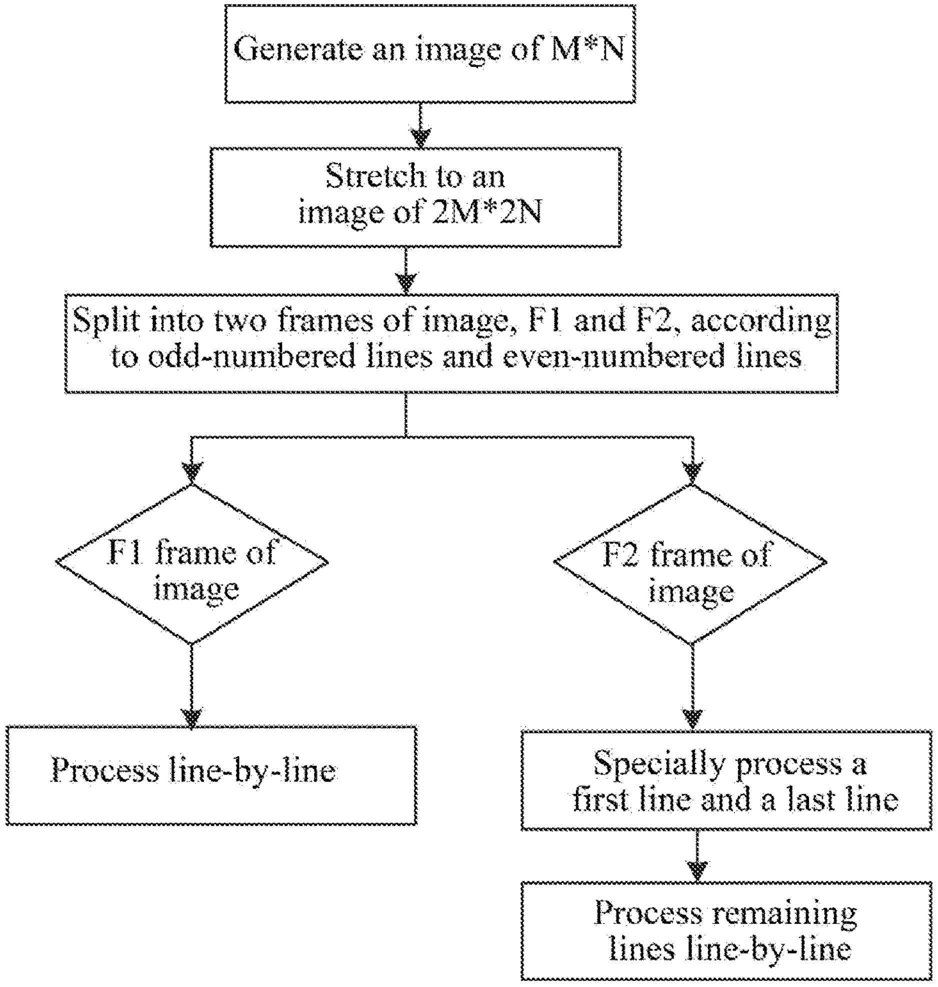
FIG. 11 is a flowchart of another display method of a display panel according to an embodiment of the present disclosure.

In this embodiment, as shown in FIGS. 10 and 11, a low-resolution image (with a resolution of M*N) input from a video generator needs to be enlarged at a driver chip of the display panel, and usually can be processed by an interpolation algorithm such as bicubic interpolation to obtain a high-resolution image (with a resolution of 2M*2N), and then the obtained high-resolution image is split into an odd-numbered line image and an even-numbered line image by the above-mentioned display method, and the odd-numbered line image and the even-numbered line image are displayed according to the above-mentioned display method. At this time, the display panel needs to store ¼ data of the frame in the buffer in advance (when the image to be displayed is an 8K image, the display panel needs to buffer data of a 2K image).

In some exemplary embodiments, the display method further includes:

receiving a plurality of frames of original images with a resolution of M*N;

determining a moving speed of an object in the plurality of frames of original images;

if the moving speed of the object in the plurality of frames of original images is greater than a first preset moving speed, the original images are replicated horizontally to obtain a first intermediate processing image with a resolution of M*2N, and a gray-scale value of an image pixel unit in a (2Z−1)-th column is equal to that of an image pixel unit in a 2Z-th column, where 1≤Z≤N, so that M*2N sub-pixel units display gray-scale values of M*2N image pixel units in the first intermediate processing image;

if the moving speed of the object in the plurality of frames of original images is less than or equal to the first preset moving speed, stretching the original images to obtain a second intermediate processing image with a resolution of 2M*2N, splitting the second intermediate processing image into an odd-numbered line image and an even-numbered line image to obtain an image to be displayed, and displaying the image to be displayed according to the display method in the above-mentioned embodiments.

Figure 12:
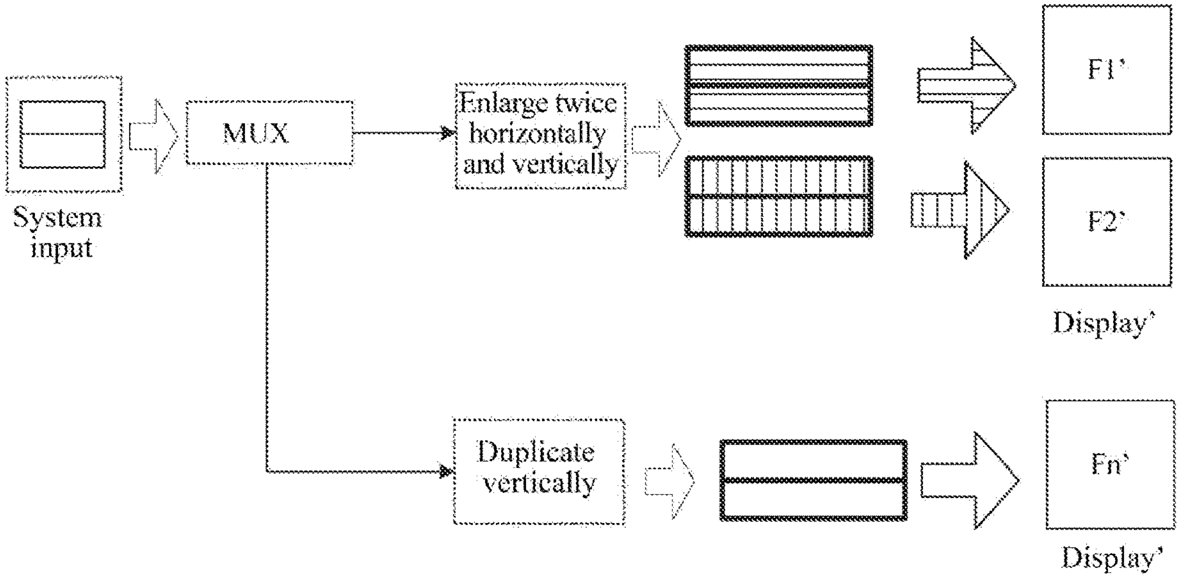
FIG. 12 is a schematic diagram of another display method of a display panel according to an embodiment of the present disclosure.
Figure 13:
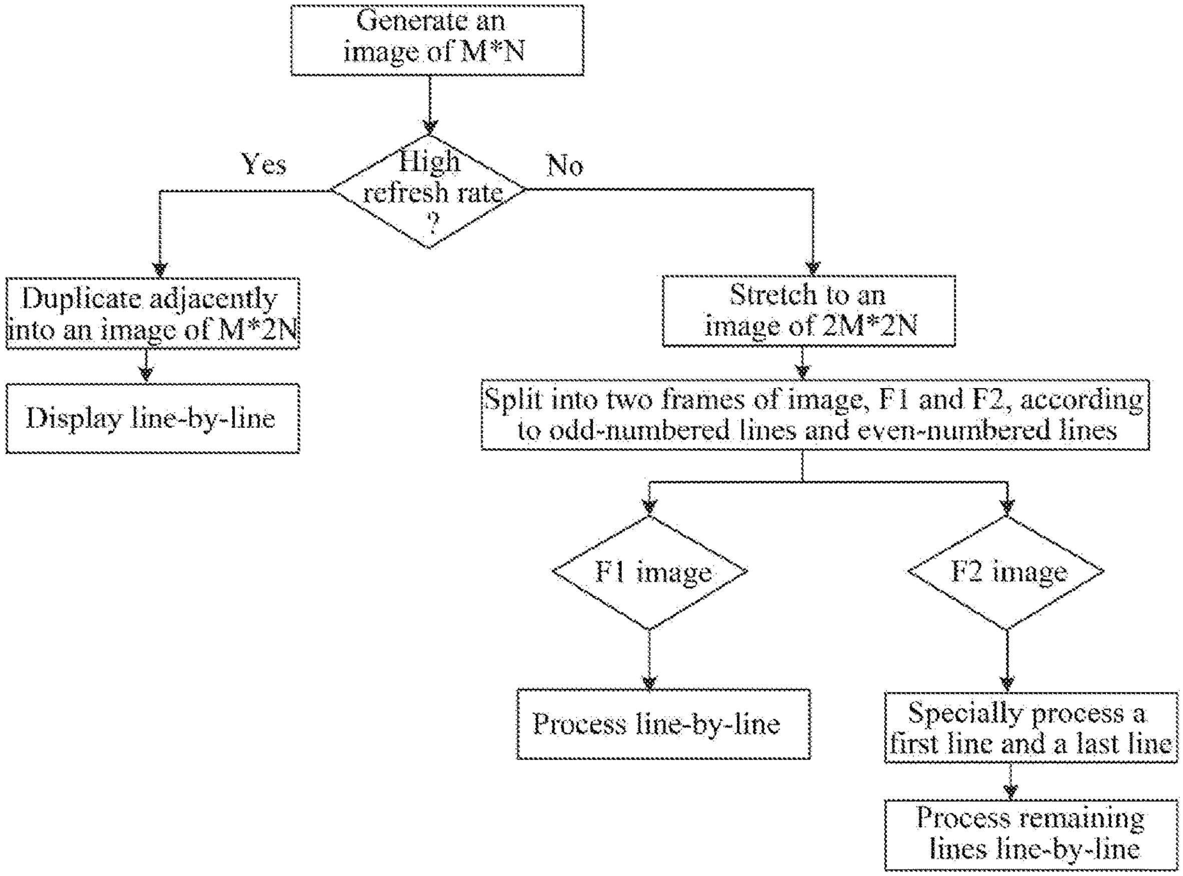
FIG. 13 is a flowchart of another display method of a display panel according to an embodiment of the present disclosure.

In this embodiment, as shown in FIGS. 12 and 13, a system-transmitted image with a resolution of M*N can be determined by a multiplex (MUX) module or a driver chip in a display panel and subsequent processing can be selected. If the moving speed of the object in the system-transmitted image is slow and the image is approximately a static image, the image is stretched according to the above-mentioned display method to obtain the second intermediate processing image, and the resolution of the second intermediate processing image is 2M*2N. The second intermediate processing image is split into an odd-numbered line image and an even-numbered line image to obtain an image to be displayed, and displayed according to the above-mentioned display method; if there is a significant difference between each frame of the system-transmitted image, only an original vertical resolution is maintained by 2-times duplicated vertically, while a horizontal resolution does not need to be improved. By this means, effects of dynamic images in a high refresh rate and static images with a high resolution can be achieved, which are more conformed to visual characteristics of human eyes.

Figure 14:
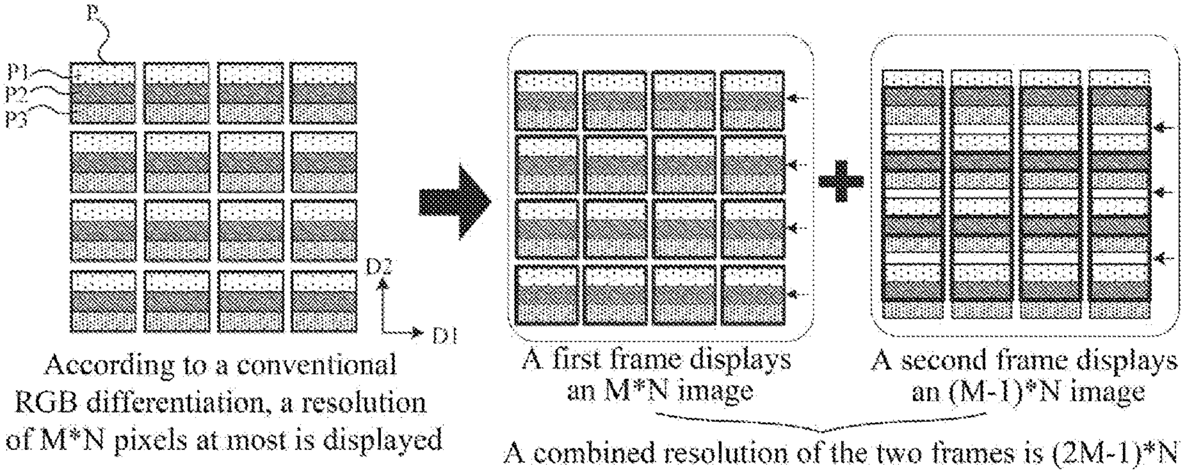
FIG. 14 is a schematic diagram of another principle of time division multiplexing of sub-pixels in a display panel according to an embodiment of the present disclosure.

A display method of a display panel is further provided in an embodiment of the present disclosure. As shown in FIG. 14, the display panel includes M*N pixel units P. Each of the pixel units P includes one first sub-pixel P1, one second sub-pixel P2, and one third sub-pixel P3. The first sub-pixel P1, the second sub-pixel P2 and the third sub-pixel P3 are arranged in a second direction D2. The display method includes the following steps.

A plurality of frames of images to be displayed are acquired, wherein one frame in adjacent two frames of images to be displayed is an odd-numbered line image with a resolution of M*N, and another frame in the adjacent two frames of the images to be displayed is an even-numbered line image with a resolution of M*N or (M−1)*N.

An odd-numbered display group displays the odd-numbered line image, and an even-numbered display group displays the even-numbered line image. The odd-numbered display group includes M*N odd-numbered display units, and the even-numbered display unit includes (M−1)*N even-numbered display units. An odd-numbered display unit in an i-th line includes a first sub-pixel P1 in an i-th line pixel unit, a second sub-pixel P2 in the i-th line pixel unit and a third sub-pixel P3 in the i-th line pixel unit. An even-numbered display unit in a j-th line includes a second sub-pixel P2 in a j-th line pixel unit, a third sub-pixel P3 in the j-th line pixel unit, a first sub-pixel P1 in a (j+1)-th line pixel unit and a second sub-pixel P2 in the (j+1)-th line pixel unit, wherein the number i is a natural number between 1 and M, and the number j is a natural number between 1 and (M−1).

According to the display method of the display panel in the embodiment of the present disclosure, for the display panel with an original resolution of M*N, two frames are multiplexed in a horizontal direction, in which one frame takes the second sub-pixel as a pixel centroid to build a resolution of M, and another frame takes the third sub-pixel and the first sub-pixel as a pixel centroid to build a resolution of (M−1). The two frames are alternately displayed to build a display with a resolution of (2M−1), thereby improving the image display resolution and achieving resolution improvement in a 2D display mode.

The display method can be integrated in a driver chip of the display panel as an algorithm Intelligent Property (IP for short) module. By processing data of an input picture, an image with a high resolution of 2M*N is split into two frames of images with a resolution of M*N for alternate display, thus improving the resolution. On the other hand, due to an effect that two frames are multiplexed into one frame, a real display frequency is half of the display frequency of the display, theretofore a display having a higher frequency is preferred. A low refresh rate of a display panel leads to jitter between two frames. According to the current display technologies, a refresh rate of 120 Hz can be reached generally. By virtue of the display method in the embodiment of the present disclosure, the refresh rate can reach 60 Hz, and a better visual effect can also be achieved.

In some exemplary embodiments, each frame of image to be displayed is split into an odd-numbered line image and an even-numbered line image by a video generator, or split into an odd-numbered image and an even-numbered line image by a video player.

When each frame of image to be displayed is split into an odd-numbered line image and an even-numbered line image by the video generator, a system of the video generator divides a frame of picture with a high resolution of 2M*N into a frame of an odd-numbered line image and a frame of an even-numbered line image (the video generator is usually a GPU that processes according to a requirement of extracting data from odd and even lines), and transmits the images to the display panel. In this way, each frame of image with a resolution of 2M*N can be divided into two frames of image with a resolution of M*N. The two frames, F1 and F2, are transmitted to the display panel. The above-mentioned process repeatedly carries on. At this time, the display panel needs to store display data of a line image in a buffer in advance.

When each frame of image to be displayed is split into an odd-numbered line image and an even-numbered line image by the video player, the system of the video generator directly splits the image transmitted to the system of the video generator the display panel without need of changing a shape of the picture transmitted to the system. At this time, the display panel needs to store a half data of the frame in advance (when the image to be displayed is an 8K image, the display panel needs to buffer data of a 4K image), which further occupies storage resources of a driver chip of the display panel.

In this embodiment, a video generator generates an image with a resolution of 2M*N, and then the video generator or a video player splits the image into an odd-numbered line image and an even-numbered line image, so that the odd-numbered display group displays the odd-numbered line image line-by-line, and the even-numbered display group displays the even-numbered line image.

When splitting an image, odd-even line splitting is performed according to line numbers, in which an odd-numbered line image is composed of data of the odd-numbered line image, and an even-numbered line image is composed of data of the even-numbered line image. The odd-numbered line image and the even-numbered line image are successively transmitted to the display panel. Since an even-numbered line display group loses one line of data when displaying the even-numbered line image, a last line of an original image may not be transmitted, that is, the even-numbered line image (F2 frame) transmits one line of data less than the odd-numbered line image (F1 frame).

In some exemplary embodiments, the odd-numbered display group displaying the odd-numbered line image includes:

for 1≤x≤M, 1≤y≤2N, a first sub-pixel of a sub-pixel unit in an x-th row and a y-th column displaying a gray-scale value of a first image pixel unit in an x-th row and a y-th column in the odd-numbered line image, a second sub-pixel of the sub-pixel unit in the x-th row and the y-th column displaying a gray-scale value of a second image pixel unit in the x-th row and the y-th column in the odd-numbered line image, and a third sub-pixel of the pixel units in the x-th row and the y-th column displaying the gray-scale value of a third image pixel unit in the x-th row and the y-th column in the odd-numbered line image.

Figure 15:
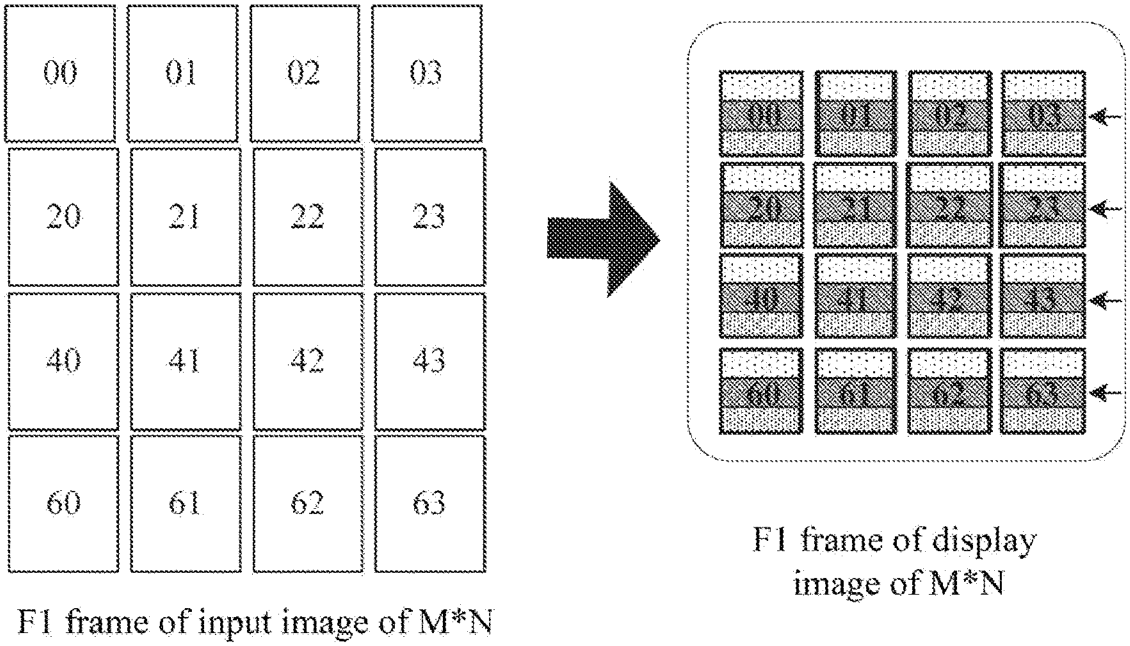
FIG. 15 is a schematic diagram of another image processing method of an odd-numbered line image according to an embodiment of the present disclosure.

In this embodiment, if the image is an F1 frame image, an image with a resolution of M*N is displayed according to FIG. 15. R, G and B of a "00"-numbered pixel in the input F1 frame image correspond to R, G, and B pixels centered on a second sub-pixel "00" in a displayed image, respectively. As shown in FIG. 15, each rectangular frame of an input image on the left represents the input RGB pixel data. Each bold black rectangular frame in a displayed image on the right corresponds to an odd-numbered display unit. An odd-numbered display unit in an i-th line includes one first sub-pixel of pixel units in the i-th line, one second sub-pixel of the pixel units in the i-th line and one third sub-pixel of the pixel units in the i-th line, where i is a natural number between 1 and M. Assignments of the input data to the display pixels are performed according to one-to-one correspondence, with reference to the following formula.

Display $R(x,y)$=input $R(x,y)$;display $G(x,y)$=input $G(x,y)$;display $B(x,y)$=input $B(x,y)$; where $x=1\sim M, y=1\sim N$.

In some exemplary embodiments, the even-numbered display group displaying the even-numbered line image includes:

for 2≤c≤M, 1≤y≤N, a first sub-pixel of a sub-pixel unit in a c-th row and a y-th column displaying a gray-scale value of a first image pixel unit in a (c−1)-th row and a y-th column in the even-numbered line image;

for 1≤y≤N, a second sub-pixel of a pixel unit in a first row and the y-th column displaying A times of a gray-scale value of the second image pixel unit in a first row and the y-th column in the even-numbered line image, wherein A is a real number between 0 and 1;

for 2≤d≤(M−1) and 1≤y≤N, the second sub-pixel of the pixel unit in a d-th row and the y-th column displaying a sum of A times of a gray-scale value of a second image pixel unit in a d-th row and the Y-th column in the even-numbered line image and (1−A) times of a gray-scale value of a second image pixel unit in a (d−1)-th row and the y-th column in the even-numbered line image;

for 1≤y≤N, a second sub-pixel of a pixel unit in an M-th row and the y-th column displaying (1−A) times of a gray-scale value of a second image pixel unit in an (M−1)-th row and the y-th column in the even-numbered line image; and for 1≤e≤(M−1), 1≤y≤N, a third sub-pixel of a pixel unit in an e-th row and the y-th column displaying a gray-scale value of a third image pixel unit in an e-th row and the y-th column in the even-numbered line image.

In some exemplary embodiments, the even-numbered display group displaying the even-numbered line image further includes:

for 1≤y≤N, a first sub-pixel of a pixel unit in a first row and a y-th column displaying a gray-scale value of 0 or a gray-scale value of a first image pixel unit in the first row and the y-th column in the odd-numbered line image; and for 1≤y≤N, a third sub-pixel of a pixel unit in an M-th row and the y-th column displaying a gray-scale value of 0 or a gray-scale value of a third image pixel unit in the M-th row and the y-th column in the odd-numbered line image.

Figure 16:
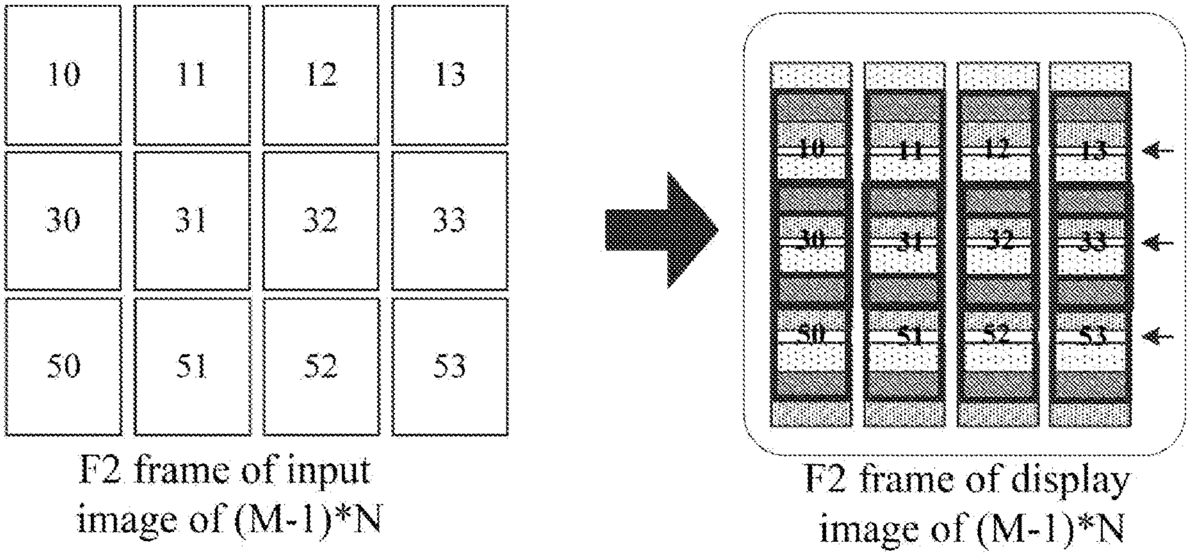
FIG. 16 is a schematic diagram of another image processing method of an even-numbered line image according to an embodiment of the present disclosure.

In this embodiment, if the image is an F2 frame image, an image with a resolution of (M−1)*N is displayed according to FIG. 16. As shown in FIG. 16, each rectangular frame of an input image on the left represents input RGB pixel data. Each bold black rectangular frame in a displayed image on the right corresponds to an even-numbered display unit. An even-numbered display unit in a j-th line includes one second sub-pixel of pixel units in the j-th line, one third sub-pixel of the pixel units in the j-th line, one first sub-pixel of pixel units in a (j+1)-th line and one second sub-pixel of the pixel units in the (j+1)-th line, wherein j is a natural number between 1 and (M−1). Two adjacent even-numbered display units located in the j-th line and the (j+1)-th line respectively need to share one second sub-pixel in the pixel units in the (j+1)-th line. Assignments of the input data to the display pixels can be performed with reference to the following steps (1) to (3) (assuming that the first sub-pixel is a red sub-pixel, the second sub-pixel is a green sub-pixel, and the third sub-pixel is a blue sub-pixel).

(1) Red sub-pixels in a first line are specially processed, 0 or a value same as that in the F1 frame can be assigned to all of the red sub-pixels (at this time, data in one line in the F1 frame can be stored for the F2 frame).

$$\text{Display } R(1,y)=0;\text{ or, display } R(1,y)(F2)=\text{display } R(1,Y)(F1),\text{ where } 1\le Y\le 2N.$$

Data of red sub-pixels in a non-first line are processed according to the following formula:

$$\text{display } R(c,y)=\text{input } R(c-1,y),\text{ where } 2\le c\le M.$$

(2) Green sub-pixels are processed. For a sub-pixel displaying "10" G, a sub-pixel with an input "10" G is split into a "10" G1 sub-pixel and a "10" G2 sub-pixel. The "10" G1 sub-pixel is displayed in the sub-pixel displaying "10" G, and "10" G2 sub-pixel is stored in a linebuffer. After a sub-pixel displaying "30" is split into a sub-pixel "30" G1 and "a 30" G2 sub-pixel, the "10" G2 sub-pixel and the "30" G1 sub-pixel are added and assigned to the sub-pixel with the input "30" G, and the "30" G2 sub-pixel corresponding to the sub-pixel with the input "30" is also stored, and after a sub-pixel with an input "50" G is split into "50" G1 and "50" G2 sub-pixels, the "30" G2 sub-pixel and the "50" G1 sub-pixel are added and assigned to the sub-pixel with the input "50" G, and so on. For example, the split algorithm can directly divide an original G pixel value by 2. The following formula can be used.

$$\text{For } G \text{ in a first line: display } G(1,y)=A^*\text{input } G(1,y);$$

$$\text{for } G \text{ in other lines: display } G(d,Y)=A^*\text{input } G(d,Y)+(1-A)^*\text{input } G(d-1,Y),\text{ where } 2\le d\le (M-1);\text{ and}$$

$$\text{for } G \text{ in a last line: display } G(M,y)=(1-A)^*\text{input } G(M-1,y);$$

wherein A can be set to any value between 0 and 1. For example, A=0.5.

(3) Data of blue sub-pixels in a non-last line are processed according to the following formula:

$$\text{display } B(e,y)=\text{input } B(e,y),\text{ where } 1\le e\le M-1.$$

Blue sub-pixels in the last line are specially processed, 0 or a value same as that in the F1 frame can be assigned to all of the blue sub-pixels (data in one line in the F1 frame are stored for the F2 frame).

$$\text{Display } B(M,y)=0;\text{ or display } B(M,Y)(F2)=\text{display } B(M,y)(F1).$$

In some exemplary embodiments, acquiring the plurality of frames of images to be displayed includes:

receiving an original image with a resolution of M*N;

stretching the original image to obtain a fourth intermediate processing image with a resolution of 2M*N; and splitting the fourth intermediate processing image into an odd-numbered line image and an even-numbered line image to obtain an image to be displayed.

In this embodiment, a low-resolution image (with a resolution of M*N) input from a video generator needs to be enlarged at a driver chip of the display panel, and usually can be processed by an interpolation algorithm such as bicubic interpolation to obtain a high-resolution image (with a resolution of 2M*N), and then the obtained high-resolution image is split into an odd-numbered line image and an even-numbered line image by the above-mentioned display method, and the odd-numbered line image and the even-numbered line image are displayed according to the above-mentioned display method. At this time, the display panel needs to store ¼ data of the frame in the buffer in advance (when the image to be displayed is an 8K image, the display panel needs to buffer data of a 2K image).

In some exemplary embodiments, the display method further includes:

receiving a plurality of frames of original images with a resolution of M*N;

determining a moving speed of an object in the plurality of frames of original images;

when the moving speed of the object in the plurality of frames of original images is greater than a first preset moving speed, M*N sub-pixel units directly displaying gray-scale values of M*N image pixel units in the original image;

if the moving speed of the object in the plurality of frames of original images is less than or equal to the first preset moving speed, the original images are stretched to obtain a third intermediate processing image with a resolution of 2M*N, splitting the third intermediate processing image into an odd-numbered line image and an even-numbered line image to obtain an image to be displayed, and displaying the image to be displayed according to the display method in the above-mentioned embodiments.

In this embodiment, a system-=transmitted image with a resolution of M*N can be determined by a multiplex (MUX) module or a driver chip in a display panel and subsequent processing can be selected. If the moving speed of the object in the system-transmitted image is slow and the image is approximately a static image, the image is stretched according to the above-mentioned display method to obtain the first intermediate processing image. The resolution of the first intermediate processing image is 2M*N, and the first intermediate processing image is split into an odd-numbered line image and an even-numbered line image to obtain an image to be displayed, and displayed according to the above-mentioned display method; if there is a significant difference between each frame of the system transmitted image, the system-transmitted images are displayed directly. By this means, effects of dynamic images in a high refresh rate and static images with a high resolution can be achieved, which are more conformed to the visual characteristics of human eyes.

A display control apparatus for a display panel is further provided in an embodiment of the present disclosure. The display panel includes M*N pixel units, each of which includes one or more first sub-pixels arranged in a first direction, one or more second sub-pixels arranged in the first direction, and one or more third sub-pixels arranged in the first direction. The one or more first sub-pixels, the one or more second sub-pixels and the one or more third sub-pixels are arranged in a second direction with respect to each other, and the first direction intersects with the second direction.

Figure 17:
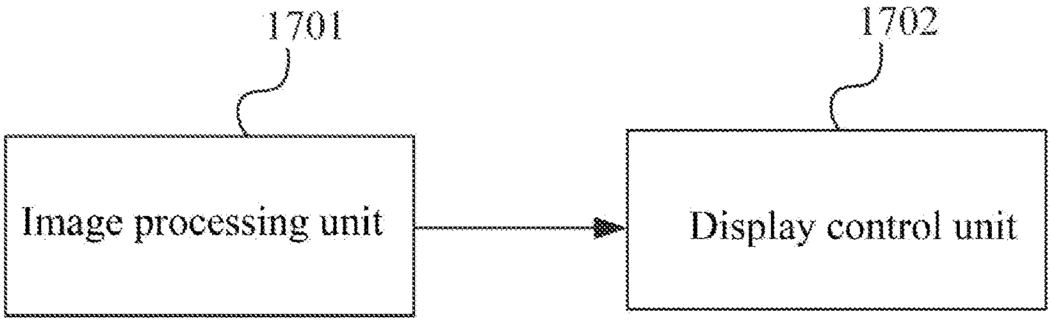
FIG. 17 is a schematic diagram of a structure of a display control apparatus according to an embodiment of the present disclosure.

As shown in FIG. 17, the display control apparatus includes an image processing unit 1701 and a display control unit 1702. The image processing unit 1701 is configured to acquire a plurality of frames of images to be displayed, wherein one frame in adjacent two frames of images to be displayed is an odd-numbered line image with a resolution of M*(a*N), and another frame in the adjacent two frames of the images is an even-numbered line image with a resolution of M*(a*N) or (M−1)*(a*N), wherein a is 1 or 2.

The display control unit 1702 is configured to cause an odd-numbered display group to display the odd-numbered line image, and to cause an even-numbered display group to display the even-numbered line image. The odd-numbered display group includes M*(a*N) odd-numbered display units, and the even-numbered display unit includes (M−1)*(a*N) even-numbered display units. An odd-numbered display unit in an i-th line includes a first sub-pixel in an i-th line pixel unit, a second sub-pixel in the i-th line pixel unit and a third sub-pixel in the i-th line pixel unit. An even-numbered display unit in a j-th line includes a second sub-pixel in a j-th line pixel unit, a third sub-pixel in the j-th line pixel unit, a first sub-pixel in a (j+1)-th line pixel unit and a second sub-pixel in the (j+1)-th line pixel unit, wherein the number i is a natural number between 1 and M, and the number j is a natural number between 1 and (M−1).

In this embodiment, specific functions of the image processing unit 1701 and the display control unit 1702 may refer to the foregoing, which is not repeated here.

Figure 18:
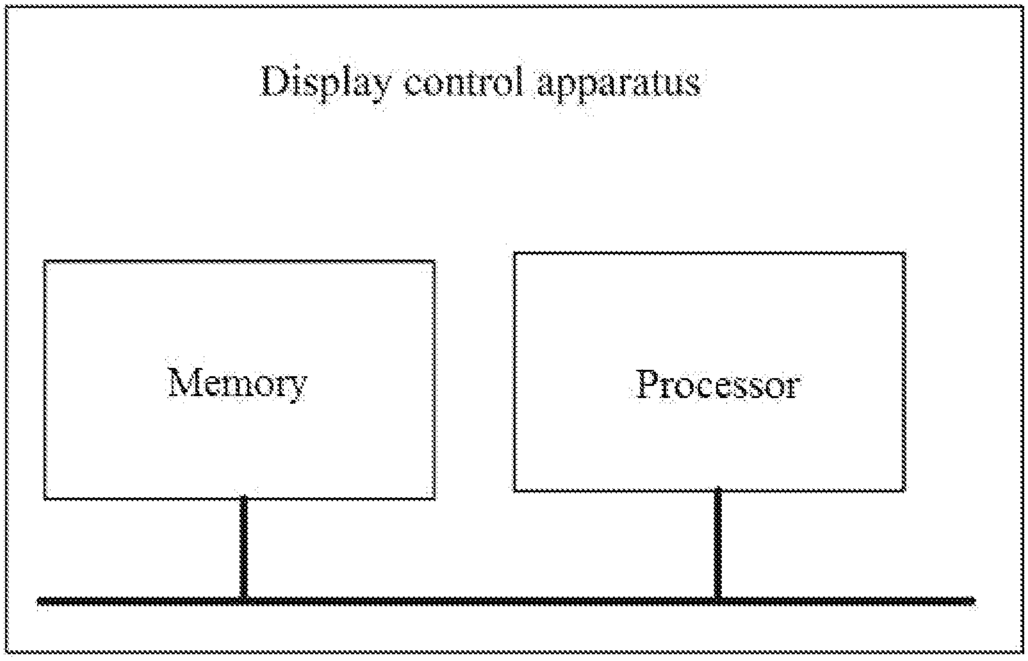
FIG. 18 is a schematic diagram of a structure of another display control apparatus according to an embodiment of the present disclosure.

A display control apparatus for a display panel is further provided in an embodiment of the present disclosure. As shown in FIG. 18, the display control apparatus includes at least one processor and at least one memory; wherein the memory stores computer execution instructions;

the at least one processor executes the computer execution instructions stored in the memory such that the at least one processor executes the display method of the display panel as described in any one of the above embodiments.

A computer readable storage medium is further provided in an embodiment of the present disclosure, in which computer execution instructions are stored, and when a processor executes the computer execution instructions, the display method of the display panel as described in the previous item is implemented.

Figure 19:
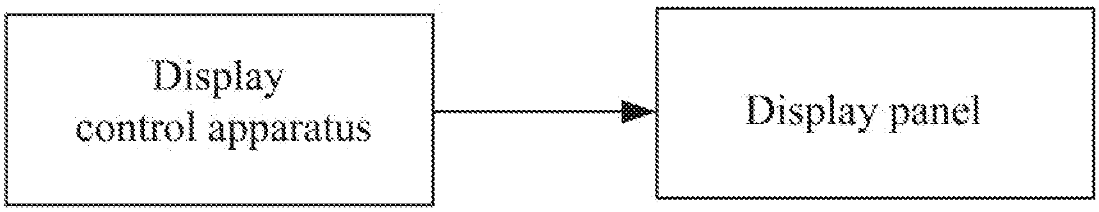
FIG. 19 is a schematic diagram of a structure of a display apparatus according to an embodiment of the present disclosure.

A display apparatus is further provided in an embodiment of the present disclosure. As shown in FIG. 19, the display apparatus includes a display panel that includes M*N pixel units, each of which includes one or more first sub-pixels arranged in a first direction, one or more second sub-pixels arranged in the first direction, and one or more third sub-pixels arranged in the first direction. The one or more first sub-pixels, the one or more second sub-pixels and the one or more third sub-pixels are arranged in a second direction, and the first direction intersects with the second direction. The display apparatus further includes the display control apparatus described above.

In the embodiments of the present disclosure, the resolution display effect of the display panel is improved by time division multiplexing of the sub-pixels and brightness difference control of the sub-pixels, so that the display panel can display clearer images with richer details, thereby solving a problem of insufficient resolution of the display panel.

In the embodiments provided in the present disclosure, it is to be understood that the disclosed apparatus and method may be implemented in other ways. For example, the apparatus embodiment described above is only schematic. For example, the division of the module is only logical function division, and there may be other division ways in practical implementation. For example, a plurality of modules or assemblies may be combined or integrated into another system, or some features may be omitted or not executed. In addition, the coupling or direct coupling or communication connection between each other displayed or discussed may be indirect coupling or communication connection between apparatuses or modules via some interfaces, and may be electrical, mechanical or in other forms.

The modules described as separate parts may be or may be not physically separated. The parts displayed as modules may be or may be not physical modules. That is, the parts may be in the same location, or may be distributed on multiple network modules. Part or all of the modules may be selected according to an actual need to achieve the objective of the solution of the embodiment.

In addition, various functional modules in various embodiments of the present disclosure may be integrated into one processing module, or various modules may exist physically and separately, or two or more modules may be integrated into one module. The above integrated module may be implemented in a form of hardware or a combination of hardware and software function modules.

Program codes for implementing the methods in the present disclosure may be written in any combination of one or more programming languages. The program code may be provided to a processor or controller of a general purpose computer, a special purpose computer, or other programmable data processing apparatus such that the program code, when executed by the processor or controller, enables the functions/operations specified in the flowchart and/or block diagram to be implemented. Program code can be executed entirely on a machine, partially on a machine, partially on a machine and partially on a remote machine as a stand-alone software package, or entirely on a remote machine or server.

In the context of the present disclosure, the machine-readable medium may be a physical medium, and may include or store a program used by or in combination with an instruction execution system, apparatus or device. The machine-readable medium may be a machine-readable signal medium or a machine-readable storage medium. The machine-readable medium may include, but is not limited to, an electronic, magnetic, optical, electromagnetic, infrared or semiconductor system, apparatus or device, or any proper combination thereof. More specific examples of the machine-readable storage medium may include an electrical connection based on one or more wires, a portable computer disk, a hard disk, a Random Access Memory (RAM), a Read-Only Memory (ROM), an Erasable Programmable ROM (EPROM) (or a flash memory), an optical fiber, a portable Compact Disc Read-Only Memory (CD-ROM), an optical storage device, a magnetic storage device, or any proper combination thereof.

Further, although the steps are depicted in a particular order, this should be understood as requiring such steps to be performed in the particular order shown or in a sequential order, or requiring that all illustrated operations should be performed to achieve the desired result. In a certain environment, multi-task and concurrent-processing may be favorable. Likewise, a plurality of specific implementation details are included in the above discussion, but they should not be explained as limits to the scope of the present disclosure. Some features described in the context of an independent embodiment may be combined for implementation in a single implementation. On the contrary, various described in the context of a single implementation may be implemented in a plurality of implementations independently or in form of any proper sub-combination.

Although the subject matter has been described with a language specific to the structural features and/or logic operations in the method, it should be understood that the subject matter defined in the appended claims is not limited to the above-described specific features or operations. On the contrary, the above-described specific features and steps are only example forms for implementing the claims.

Although the implementation modes disclosed in the present disclosure are as above, the described contents are only implementation modes used for convenience of understanding the present disclosure and are not intended to limit the present disclosure. Those skilled in the art may make any modification and change in the forms and details of the implementations without departing from the essence and scope of the present disclosure. However, the scope of protection of the present disclosure should still be subject to the scope defined by the attached claims.

The invention claimed is:

1. A display method of a display panel, wherein the display panel comprises M*N pixel units, both of M and N are natural numbers, each of the pixel units comprises one or more first sub-pixels arranged in a first direction, one or more second sub-pixels arranged in the first direction, and one or more third sub-pixels arranged in the first direction; the one or more first sub-pixels, the one or more second sub-pixels and the one or more third sub-pixels are arranged in a second direction with respect to each other, and the first direction intersects with the second direction; the display method comprises:

acquiring a plurality of frames of images to be displayed, wherein one frame in adjacent two frames of the images to be displayed is an odd-numbered line image with a resolution of M*(a*N), and another frame in the adjacent two frames of the images to be displayed is an even-numbered line image with a resolution of M*(a*N) or (M−1)*(a*N), and a is 1 or 2; and an odd-numbered display group displaying the odd-numbered line image, and an even-numbered display group displaying the even-numbered line image; wherein the odd-numbered display group comprises M*(a*N) odd-numbered display units, and the even-numbered display unit comprises (M−1)*(a*N) even-numbered display units, an odd-numbered display unit in an i-th line comprises a first sub-pixel of an i-th line pixel unit, a second sub-pixel of the i-th line pixel unit and a third sub-pixel of the i-th line pixel unit, an even-numbered display unit in a j-th line comprises a second sub-pixel of a j-th line pixel unit, a third sub-pixel of the j-th line pixel unit, a first sub-pixel of a (j+1)-th line pixel unit and a second sub-pixel of the (j+1)-th line pixel unit, wherein i is a natural number between 1 and M, and j is a natural number between 1 and (M−1).

2. The display method of claim 1, wherein each pixel unit comprises 2b first sub-pixels arranged in the first direction, 2b second sub-pixels arranged in the first direction, 2b third sub-pixels arranged in the first direction, wherein b is a natural number greater than or equal to 1, each pixel unit is divided into 2 sub-pixel units, each sub-pixel unit comprises b first sub-pixels arranged in the first direction, b second sub-pixels arranged in the first direction, and b third sub-pixels arranged in the first direction.

3. The display method of claim 2, wherein a=2, and the odd-numbered display group displaying the odd-numbered line image comprises:

for 1≤X≤M, 1≤Y≤2N, a first sub-pixel of a sub-pixel unit in an X-th row and a Y-th column displaying a gray-scale value of a first image pixel unit in the X-th row and the Y-th column in the odd-numbered line image, a second sub-pixel of the sub-pixel unit in the X-th row and the Y-th column displaying a gray-scale value of a second image pixel unit in the X-th row and the Y-th column in the odd-numbered line image, and a third sub-pixel of the pixel unit in the X-th row and the Y-th column displaying a gray-scale value of a third image pixel unit in the X-th row and the Y-th column in the odd-numbered line image.

4. The display method of claim 2, wherein a=2, and the even-numbered display group displaying the even-numbered line image comprises:

for 2≤c≤M, 1≤Y≤2N, a first sub-pixel of a sub-pixel unit in a c-th row and a Y-th column displaying a gray-scale value of a first image pixel unit in a (c−1)-th row and a Y-th column in the even-numbered line image;

for 1≤Y≤2N, a second sub-pixel of a sub-pixel unit in a first row and the Y-th column displaying A times of a gray-scale value of a second image pixel unit in the first row and the Y-th column in the even-numbered line image, wherein A is a real number between 0 and 1;

for 2≤d≤(M−1) and 1≤Y≤2N, a second sub-pixel of the sub-pixel unit in a d-th row and the Y-th column displaying a sum of A times of a gray-scale value of a second image pixel unit in a d-th row and the Y-th column in the even-numbered line image and (1-A) times of a gray-scale value of a second image pixel unit in a (d−1)-th row and the Y-th column in the even-numbered line image;

for 1<Y≤2N, a second sub-pixel of a sub-pixel unit in an M-th row and the Y-th column displaying (1−A) times of a gray-scale value of a second image pixel unit in an (M−1)-th row and the Y-th column in the even-numbered line image; and for 1≤e≤(M−1), 1≤Y≤2N, a third sub-pixel of a sub-pixel unit in an e-th row and the Y-th column displaying a gray-scale value of a third image pixel unit in an e-th row and the Y-th column in the even-numbered line image.

5. The display method of claim 2, wherein the even-numbered display group displaying the even-numbered line image further comprises:

for 1≤Y≤2N, a first sub-pixel of a sub-pixel unit in a first row and a Y-th column displaying a gray-scale value of 0 or a gray-scale value of a first image pixel unit in a first row and the Y-th column in the odd-numbered line image; and for 1≤Y≤2N, a third sub-pixel of a sub-pixel unit in an M-th row and the Y-th column displaying the gray-scale value of 0 or a gray-scale value of a third image pixel unit in an M-th row and the Y-th column in the odd-numbered line image.

6. The display method of claim 2, wherein a=2, and the display method further comprises:

receiving a plurality of frames of original images with a resolution of M*N;

determining a moving speed of an object in the plurality of frames of original images;

if the moving speed of the object in the plurality of frames of original images is greater than a first preset moving speed, the original images are replicated horizontally to obtain a first intermediate processing image with a resolution of M*2N, and a gray-scale value of an image pixel unit in a (2Z−1)-th column is equal to a gray-scale value of an image pixel unit in a 2Z-th column, wherein 1≤Z≤N, so that M*2N sub-pixel units display gray-scale values of M*2N image pixel units in the first intermediate processing image; and if the moving speed of the object in the plurality of frames of original images is less than or equal to the first preset moving speed, stretching the original images to obtain a second intermediate processing image with a resolution of 2M*2N, splitting the second intermediate processing image into an odd-numbered line image and an even-numbered line image to obtain the images to be displayed.

7. The display method of claim 1, wherein a=1, and the odd-numbered display group displaying the odd-numbered line image comprises:

for 1≤x≤M, 1≤y≤2N, a first sub-pixel of a sub-pixel unit in an x-th row and a y-th column displaying a gray-scale value of a first image pixel unit in a x-th row and a y-th column in the odd-numbered line image, a second sub-pixel of the sub-pixel unit in the x-th row and the y-th column displaying a gray-scale value of a second image pixel unit in the x-th row and the y-th column in the odd-numbered line image, and a third sub-pixel of the pixel unit in the x-th row and the y-th column displaying a gray-scale value of a third image pixel unit in the x-th row and the y-th column in the odd-numbered line image.

8. The display method of claim 1, wherein a=1, and the even-numbered display group displaying the even-numbered line image comprises:

for 2≤c≤M, 1≤y≤N, a first sub-pixel of a pixel unit in a c-th row and a y-th column displaying a gray-scale value of a first image pixel unit in a (c−1)-th row and a y-th column in the even-numbered line image;

for 1≤y≤N, a second sub-pixel of a pixel unit in a first row and the y-th column displaying A times of a gray-scale value of a second image pixel unit in a first row and the y-th column in the even-numbered line image, wherein A is a real number between 0 and 1;

for 2≤d≤(M−1), 1≤y≤N, a second sub-pixel in a pixel unit in a d-row and the y-column displaying a sum of A times of a gray-scale value of a second image pixel unit in a d-row and the y-column in the even-numbered line image and (1−A) times of a gray-scale value of a second image pixel unit in a (d−1)-th row and the y-column in the even-numbered line image;

for 1≤y≤N, a second sub-pixel of a pixel unit in an M-th row and the y-th column displaying (1−A) times of a gray-scale value of a second image pixel unit in an (M−1)-th row and the y-th column in the even-numbered line image; and for 1≤e≤(M−1), 1≤y≤N, a third sub-pixel of a pixel unit in an e-th row and the y-th column displaying a gray-scale value of a third image pixel unit in an e-th row and the y-th column in the even-numbered line image.

9. The display method of claim 8, wherein the even-numbered display group displaying the even-numbered line image further comprises:

for 1≤y≤N, a first sub-pixel of a pixel unit in a first row and a y-th column displaying a gray-scale value of 0 or a gray-scale value of a first image pixel unit in a first row and a y-th column in the odd-numbered line image; and for 1≤y≤N, a third sub-pixel of a pixel unit in an M-th row and the y-th column displaying the gray-scale value of 0 or a gray-scale value of a third image pixel unit in an M-th row and the y-th column in the odd-numbered line image.

10. The display method of claim 1, wherein a=1, and the display method further comprises:

receiving a plurality of frames of original images with a resolution of M*N;

determining a moving speed of an object in the plurality of frames of original images;

when the moving speed of the object in the plurality of frames of original images is greater than a first preset moving speed, M*N sub-pixel units displaying gray-scale values of M*N image pixel units in the original images; and if the moving speed of the object in the plurality of frames of original images is less than or equal to the first preset moving speed, stretching the original images to obtain a third intermediate processing image with a resolution of 2M*N, splitting the third intermediate processing image into the odd-numbered line image and the even-numbered line image to obtain the images to be displayed.

11. The display method of claim 1, wherein each frame of image to be displayed is split into the odd-numbered line image and the even-numbered line image by a video generator, or split into the odd-numbered image and the even-numbered line image by a video player.

12. The display method of claim 1, wherein the acquiring the plurality of frames of images to be displayed comprises:

receiving an original image with a resolution of M*N;

stretching the original image to obtain a fourth intermediate processing image with a resolution of 2M*(a*N); and splitting the fourth intermediate processing image into the odd-numbered line image and the even-numbered line image to obtain the images to be displayed.

13. A display control apparatus for a display panel, comprising a memory, a processor and a computer program stored on the memory and capable of running on the processor, wherein the display panel comprises M*N pixel units, both of M and N are natural numbers, each of the pixel units comprises one or more first sub-pixels arranged in a first direction, one or more second sub-pixels arranged in the first direction, and one or more third sub-pixels arranged in the first direction; the one or more first sub-pixels, the one or more second sub-pixels and the one or more third sub-pixels are arranged in a second direction with respect to each other, and the first direction intersects with the second direction; the processor is configured to execute the computer program to:

acquire a plurality of frames of images to be displayed, wherein one frame in adjacent two frames of the images to be displayed is an odd-numbered line image with a resolution of M*(a*N), and another frame in the adjacent two frames of the images to be displayed is an even-numbered line image with a resolution of M*(a*N) or (M−1)*(a*N), and a is 1 or 2; and display the odd-numbered line image by an odd-numbered display group, and display the even-numbered line image by an even-numbered display group; wherein the odd-numbered display group comprises M*(a*N) odd-numbered display units, and the even-numbered display unit comprises (M−1)*(a*N) even-numbered display units, an odd-numbered display unit in an i-th line comprises a first sub-pixel of an i-th line pixel unit, a second sub-pixel of the i-th line pixel unit and a third sub-pixel of the i-th line pixel unit, an even-numbered display unit in a j-th line comprises a second sub-pixel of a j-th line pixel unit, a third sub-pixel of the j-th line pixel unit, a first sub-pixel of a (j+1)-th line pixel unit and a second sub-pixel of the (j+1)-th line pixel unit, wherein i is a natural number between 1 and M, and j is a natural number between 1 and (M−1).

14. A display apparatus, comprising the display panel and the display control apparatus of claim 13.

15. A non-transitory computer readable storage medium storing computer executable instructions, wherein the computer executable instructions, when executed by a processor, cause the processor to:

acquire a plurality of frames of images to be displayed by a display panel, wherein the display panel comprises M*N pixel units, both of M and N are natural numbers, each of the pixel units comprises one or more first sub-pixels arranged in a first direction, one or more second sub-pixels arranged in the first direction, and one or more third sub-pixels arranged in the first direction; the one or more first sub-pixels, the one or more second sub-pixels and the one or more third sub-pixels are arranged in a second direction with respect to each other, and the first direction intersects with the second direction; one frame in adjacent two frames of the images to be displayed is an odd-numbered line image with a resolution of M*(a*N), and another frame in the adjacent two frames of the images to be displayed is an even-numbered line image with a resolution of M*(a*N) or (M−1)*(a*N), and a is 1 or 2; and display the odd-numbered line image by an odd-numbered display group, and display the even-numbered line image by an even-numbered display group; wherein the odd-numbered display group comprises M*(a*N) odd-numbered display units, and the even-numbered display unit comprises (M−1)*(a*N) even-numbered display units, an odd-numbered display unit in an i-th line comprises a first sub-pixel of an i-th line pixel unit, a second sub-pixel of the i-th line pixel unit and a third sub-pixel of the i-th line pixel unit, an even-numbered display unit in a j-th line comprises a second sub-pixel of a j-th line pixel unit, a third sub-pixel of the j-th line pixel unit, a first sub-pixel of a (j+1)-th line pixel unit and a second sub-pixel of the (j+1)-th line pixel unit, wherein i is a natural number between 1 and M, and j is a natural number between 1 and (M−1).

* * * * *